(12) United States Patent
Lim et al.

(10) Patent No.: US 12,485,092 B2
(45) Date of Patent: Dec. 2, 2025

(54) COMPOSITION FOR PROMOTING DRUG RELEASE OF DRUG-DELIVERY LIPOSOMES

(71) Applicants: INDUSTRY ACADEMY COOPERATION FOUNDATION OF SEJONG UNIVERSITY, Seoul (KR); AJOU UNIVERSITY INDUSTRY-ACADEMIC COOPERATION FOUNDATION, Gyeonggi-do (KR)

(72) Inventors: Soo Jeong Lim, Seoul (KR); Eun A Kim, Gyeonggi-do (KR); So Hee Kim, Seoul (KR); Hyeon Gyeom Choi, Gyeonggi-do (KR)

(73) Assignees: INDUSTRY ACADEMY COOPERATION FOUNDATION OF SEJONG UNIVERSITY, Seoul (KR); AJOU UNIVERSITY INDUSTRY-ACADEMIC COOPERATION FOUNDATION, Gyeonggi-Do (KR)

( * ) Notice: Subject to any disclaimer, the term of this patent is extended or adjusted under 35 U.S.C. 154(b) by 369 days.

(21) Appl. No.: 18/122,284

(22) Filed: Mar. 16, 2023

(65) Prior Publication Data
US 2023/0301911 A1    Sep. 28, 2023

(30) Foreign Application Priority Data

Mar. 16, 2022 (KR) .................. 10-2022-0032877
Feb. 16, 2023 (KR) .................. 10-2023-0020822

(51) Int. Cl.
*A61K 9/127* (2025.01)
*A61K 9/1271* (2025.01)
*A61K 9/1277* (2025.01)
*A61K 31/704* (2006.01)
*A61P 35/00* (2006.01)

(52) U.S. Cl.
CPC ............ *A61K 9/127* (2013.01); *A61K 9/1271* (2013.01); *A61K 9/1277* (2013.01); *A61K 31/704* (2013.01); *A61P 35/00* (2018.01)

(58) Field of Classification Search
None
See application file for complete search history.

(56) References Cited

U.S. PATENT DOCUMENTS 9,655,847 B1 * 5/2017 Halwani ................ A61K 9/127
2018/0263909 A1 * 9/2018 Bilgicer ................ A61K 47/10

OTHER PUBLICATIONS

Menno Van Lummei et al., (2011), "Enriching lipid nanovesicles with short-chain glucosylceramide improves doxorubicin delivery and efficacy in solid tumors", The FASEB Journal, Nanuary, 2011, vol. 25, pp. 280-289.
Interdisciplinary Approach in the 4th Industry Era for Pharmaceutical Technology, 2021, The 50th Anniversary Annual Meeting and International Conference of the Korean Society of Pharmaceutical Sciences and Technology.

* cited by examiner

*Primary Examiner* — Melissa S Mercier
(74) *Attorney, Agent, or Firm* — The PL Law Group, PLLC

(57) ABSTRACT

A composition for delivering a drug includes a drug carrying liposome carrying a drug in a liposome, and an empty liposome which does not carry the drug and includes phospholipid having a head and two fatty acid chains, wherein both of the two fatty acid chains comprises omega-3 fatty acids or their derivatives.

13 Claims, 15 Drawing Sheets

COMPOSITION FOR PROMOTING DRUG RELEASE OF DRUG-DELIVERY LIPOSOMES

CROSS-REFERENCE TO RELATED APPLICATION AND CLAIM OF PRIORITY

This application claims the benefit under 35 USC § 119 of Korean Patent Application No. 10-2022-0032877, filed on Mar. 16, 2022, and No. 10-2023-0020822, filed on Feb. 16, 2023, in the Korea Intellectual Property Office, the entire disclosure of which are incorporated herein by reference for all purposes.

BACKGROUND

1. Field of the Invention

The present invention relates to a composition for promoting drug release of drug-delivery liposomes.

2. Description of the Related Art

Liposomes have a spherical vehicle structure in which an inner aqueous phase is enclosed by a phospholipid bilayer membrane, and which is a structure spontaneously formed when phospholipids are dispersed in an aqueous solution. Liposomes have been actively researched and developed as a drug carrier because of its structural flexibility that enables encapsulation of a water-soluble drug in the inner aqueous phase and intercalation of a fat-soluble drug between phospholipid molecules forming a membrane in addition to biocompatibility of the phospholipids. Encapsulating the drug in liposomes may improve a low solubility, chemical instability and pharmacokinetic limitation such as too short blood half-life after administration of the drug, thereby increasing therapeutic effects while reducing side effects. For an anticancer drug, when it is encapsulated in liposomes having a size of 20 to 200 nm, the effect of increasing accumulation thereof to a tumor site may also be attained by enhanced permeability and retention effects (EPR effect). Such beneficial effects of the liposome may be further enhanced through the regulation of the liposome membrane composition. For example, it is known that phosphatidylcholine (hereinafter PC) having saturated fatty acid chains is less oxidized than unsaturated PC-based liposomes while having a higher phase transition temperature, therefore has a characteristic of maintaining the encapsulated drug better therein. For liposomes containing PEGylated phospholipids, the blood half-life of the drug carrying liposome can be noticeably extended. Accordingly, most of commercially available drug carrying liposomes consist of saturated PC and PEGylated phospholipids.

An anticancer agent liposome formulation, which was systematically administered (that is, administered to a whole body), is mostly accumulated in the form of liposome at a tumor interstitium site while circulating throughout the whole body, and then releases the drug therefrom, which in turn is firstly introduced into cancer cells, reaches an intracellular drug target such as nuclei to express medical effects. However, for the liposome made of saturated PC and PEGylated while having a rigid membrane, drug release from the liposome is not well done even at the tumor interstitium, therefore, it is considered that an amount of drug capable of reaching the drug target may be limited. Due to this, in spite of accumulation at a tumor site, the drug carrying liposome shows limited anticancer effects in a clinical use less than expected (e.g., doxorubicin). Further, in spite of limited blood half-life extension effects, in order to reduce the above problems, some products with considerably reduced proportion of PEGylated phospholipids are commercially available in the market (e.g., irinotecan). Although a cisplatin-carrying liposome has increased accumulation in cancer tissues compared to a cisplatin solution, it does not exhibit higher anticancer effects and thus has failed in clinical trials.

In order to overcome the above-described problems, studies on improvement of drug delivery (or release) effects of liposomes by regulating a composition of the liposome membrane are being continued. For example, PC containing a saturated fatty acid chain has a high phase transition temperature to strengthen a liposome membrane, while PC containing an unsaturated fatty acid chain may form liposomes with more excellent membrane fluidity. Based on the above features, studies on improvement of release levels of drugs by utilizing unsaturated PC as a major component of the drug carrying liposome, or by encapsulating an anticancer drug into the liposome, in which short chain sphingolipids are also intercalated into PC membrane, have been performed.

Alternatively, it has been performed a study that encapsulates an anticancer drug in a liposome composed of lysoPC, which sensitively responds to heat and can release drug, heats a tumor site after administration in order to improve a local drug release level. However, in such a case, there are accompanying problems in that the liposome has low self-stability, a concentration of drug encapsulation is limited, blood retention time of the drug due to unstable liposome after administration, etc. may be inhibited.

Accordingly, it is now required to develop a delivery system that can retain advantages of the existing liposome preparations such as a stable structure, high blood retention time, etc., while enhancing drug release effects of a drug carrying liposome.

SUMMARY

It is an aspect of the present invention to provide a composition that may improve drug release effects of a drug carrying liposome without inhibiting retention time in blood or stability of the liposome.

To achieve the above aspect, the following technical solutions are adopted in one or more embodiments of the present invention.

According to an aspect of the present invention, a composition for delivering a drug includes a drug carrying liposome carrying a drug in a liposome, and an empty liposome not carrying the drug, the empty liposome including phospholipid having a head and two fatty acid chains, wherein both of the two fatty acid chains includes omega-3 fatty acids or their derivatives.

The omega-3 fatty acids may be independently selected from the group consisting of docosahexaenoic acid (DHA) and eicosapentaenoic acid (EPA).

The empty liposome may further include at least one of cholesterol, oleic acid, phospholipids combined with oleic acid, or α-tocopherol.

The phospholipid having the omega-3 fatty acids or their derivatives may be included in an amount of 40% or more by weight based on a total lipid weight of the empty liposome.

The empty liposome may have a diameter of 20 nm to 400 nm.

The empty liposome may be dispersed in a solution containing at least one selected from the group consisting of histidine, sucrose, hydroxyethylpiperazine ethanesufonic acid, sodium chloride, phosphate and dextrose.

The drug carrying liposome may include phospholipid of which two fatty acid chains are saturated fatty acids.

The phospholipid of which the two fatty acid chains may be the saturated fatty acids is independently selected from the group consisting of: hydrogenated soy phosphatidylcholine (HSPC), 1,2-dimyristoyl-sn-glycero-3-phosphocholine (DMPC), hydrogenated egg phosphatidylcholine, 1,2-dipalmitoyl-sn-glycero-3-phosphocholine (DPPC) and 1,2-distearoyl-sn-glycero-3-phosphocholine (DSPC).

The drug carrying liposome may include phosphatidylcholine.

A weight ratio of a phospholipid in the drug carrying liposome and the phospholipid of the empty liposome may be 1:0.1 to 1.

The composition may further include a membrane-modified liposome, which is formed by bring the drug carrying liposome into contact with the empty liposome.

The membrane-modified liposome may have a diameter of 70 nm to 500 nm.

The drug may be an anticancer agent.

According to another aspect of the present invention, a method for delivering a drug in a subject includes administering the composition to the subject, thereby releasing the drug from the drug carrying liposome when the drug carrying liposome and the empty liposome are in physical contact with each other so that a change of lipid bilayer arrangement of the drug-carrying liposome is caused by an inter-membrane action between the lipid bilayer of the drug carrying liposome and the phospholipid of the empty liposome.

According to still another aspect of the present invention, a kit includes the composition.

According to one or more embodiments of the present invention, it is provided a composition for promoting drug release of a drug carrying liposome, which includes an empty liposome containing phospholipids to which omega-3 fatty acids or their derivatives are combined. For example, the composition of the present invention may be used as a drug delivery system in treatment of diseases such as anticancer treatment using drugs.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE INVENTION

Hereinafter, exemplary embodiments of the present invention will be described in detail. Unless otherwise specifically defined, all terms in the present specification would have the same meanings as general meanings of the corresponding terms understood by persons having common knowledge to which the present invention pertains ("those skilled in the art"), and if the general meanings conflict with the meanings of the terms used herein, the meanings used in the present specification take precedence.

<Drug Release Promoting Composition>

An embodiment of the present invention provides a composition for promoting drug release of a drug carrying liposome, which includes an empty liposome containing phospholipids to which omega-3 fatty acids or their derivatives are combined.

Figure 3:
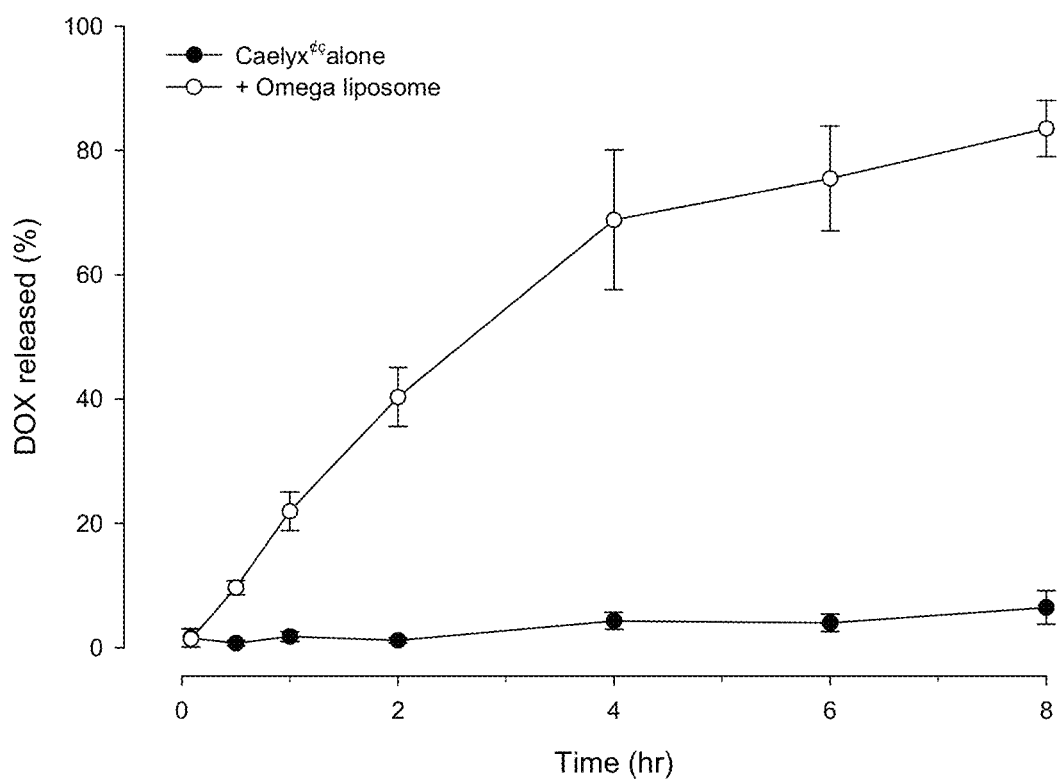
FIG. 3 is a graph illustrating variations in drug release profile from the drug carrying liposome over time depending on whether the empty liposome is mixed or not in the presence of 50% serum.

The composition for promoting drug release in an embodiment of the present invention is characterized in that the "empty liposome" may physically contact the "drug carrying liposome," wherein inter-membrane action occurs to change a membrane structure of the drug carrying liposome thus to release the carried drug to an outside of the liposome. As used herein, the "drug release" means that the drug is released from a time point at which the "empty liposome" is mixed with the "drug carrying liposome," in a time-dependent manner, and is a term contrasted with releasing at once immediately after mixing. According to an embodiment of the present invention, it was confirmed that 80% of doxorubicin carried in the liposome is time-dependently released from a mixture of the empty liposome and the drug carrying liposome for 8 hours (see FIG. 3).

The empty liposome as used herein means a liposome not carrying a drug inside of the liposome and/or in an inter-membrane space. The liposome has a vehicle structure in which an inner aqueous phase is enclosed by a membrane composed of phospholipid bilayer, wherein the phospholipid is an amphipathic molecule and has a structure in which a hydrophilic phosphoric acid group and two hydrophobic fatty acids are bonded to one glycerol molecule. More specifically, the empty liposome of the present invention refers to a liposome including phospholipid, in which both of two hydrophobic fatty acids are composed of omega-3 fatty acids or derivatives thereof, in a membrane, wherein a drug is not carried inside of the liposome and a space between the membranes. Accordingly, the empty liposome of the present invention is interchangeably used with an "omega liposome." Further, when mentioned the "empty liposome" or "omega liposome," it may also mean a liposome dispersion in which liposome is dispersed.

In the present invention, the empty liposome includes phospholipids of which the two fatty acid chains (molecules) may be omega-3 fatty acids or their derivatives. The phospholipid, to which omega-3 fatty acid or its derivative is combined, may mean phospholipid wherein both of two fatty acids in the phospholipid are composed of omega-3 fatty acids or derivatives thereof. For example, two fatty acid molecules of the phospholipid may be docosahexaenoic acid (DHA) or eicosapentaenoic acid (EPA) or its derivative, otherwise. For example, the phospholipid may be a phospholipid having each one molecule of DHA and EPA or their derivatives, respectively. For example, combinations of DHA and its derivative, combinations of EPA and its derivative, combinations of DHA and EPA, combinations of DHA and EPA derivative, combinations of DHA derivative and EPA, combinations of DHA derivative and EPA derivative, and the like are all possible.

The derivative of omega-3 fatty acid can be, for example, an ester derivative. Examples of esters may include methyl, ethyl, propyl, butyl, pentyl, t-butyl, benzyl, nitrobenzyl, methoxybenzyl, benzhydryl and trichloroethyl.

Effects of the composition for promoting drug release of an embodiment of the present invention are exerted only when both of fatty acids forming the phospholipid are omega-3 fatty acids or their derivatives. If the phospholipid is composed of omega-6 fatty acid, unlike the omega-3 fatty acid, drug release promoting effects are not demonstrated. According to an embodiment of the present invention, in the case of DA-PC(1,2-diarachidonoyl-sn-glycero-3-phosphocholine, 20:4(Cis) PC), it was confirmed that drug release promoting effects are absent unlike liposome including the phospholipid containing omega-3 fatty acid or its derivative. Further, even in the case where only one omega-3 fatty acid or its derivative molecule is contained in the phospholipid, the drug release promoting effects of an embodiment of the present invention are never exerted. According to an embodiment of the present invention, in the case of the empty liposome made of mono-DHA-PC (1-stearoyl-2-docosahexaenoyl-sn-glycero-3-phosphocholinemono-DHA-PC, 18:0-22:6 PC), drug release effects are absolutely not improved although this is mixed with a drug carrying liposome.

Meanwhile, any type of phosphoric acid groups forming the phospholipid may be used without limitation thereof. For example, it may include at least one selected the group consisting of phosphatidylcholine, phosphatidic acid, phosphatidylinositol, phsophatidylserine, ethylphosphocholine, phosphethanolamine, and phosphatodylglycerol, but it is not limited thereto. That is, the empty liposome in the present invention refers to a liposome including a phospholipid in which two hydrophobic fatty acids are all omega-3 fatty acids or their derivatives in a phospholipid bilayer, while not containing a drug in an inside of the liposome or an inter-membrane space, and corresponds to the same meaning of omega liposome in the present invention. According to an embodiment of the present invention, it was confirmed that drug release of the drug carrying liposome is also promoted by the empty liposome including phosphatidylcholine (di-DHA-PC), to which omega-3 fatty acid is combined, and phosphoethanolamine (di-DHA-PE), to which omega-3 fatty acid is combined (see Experimental Example 1).

In an embodiment of the present invention, the phospholipid including omega-3 fatty acid combined thereto may be included in an amount of 40% by weight ("wt. %") or more based on a total lipid weight of the empty liposome. According to an embodiment of the present invention, even if this is included in an amount of 44.5 wt. % based on the total lipid weight of empty liposome, it was confirmed that drug release of the drug carrying liposome is promoted (see Experimental Example 1). A lower limit of content of the phospholipid including omega-3 fatty acid combined thereto may be 40 wt. %, 50 wt. %, 60 wt. %, etc. Even when the phospholipid including omega-3 fatty acid combined thereto is included in an amount of 100 wt. % based on the total weight of empty liposome, promotion in drug release of the drug carrying liposome could be confirmed, therefore, an upper limit of the content is not limited. For example, the upper limit may be 100 wt. %, 90 wt. %, 80 wt. %, etc.

In an embodiment of the present invention, a diameter of the empty liposome may be selected according to conditions such as a liposome preparation method used by those skilled in the art or types of the drug. For instance, the empty liposome having a diameter of 20 to 400 nm, 20 to 350 nm, 20 to 300 nm, 20 to 250 nm, or 20 to 200 nm may be used (see Experimental Example 1 and Experimental Example 3). According to an embodiment of the present invention, it was confirmed that the empty liposome having a diameter of 119 nm exhibits higher drug release promotion effects than a crude dispersed liposome having a diameter of 356 nm (see Experimental Example 1), but it is not limited thereto.

In an embodiment of the present invention, the membrane of the empty liposome may further include one or more additional components such as cholesterol, oleic acid or phospholipid combined with oleic acid, or α-tocopherol, etc. The cholesterol or α-tocopherol may reduce a particle size of the empty liposome and increase stability during storage. Further, the oleic acid or phospholipid combined with oleic acid may reduce a particle size of the empty liposome while more improving an interaction with the drug carrying liposome (see Experimental Example 1). In an embodiment of the present invention, a content of the additional component such as cholesterol, oleic acid or phospholipid combined with oleic acid, or α-tocopherol, etc. may be selected within the range of known compositional ratio of the liposome. According to an embodiment of the present invention, in all cases where the cholesterol, oleic acid or phospholipid combined with oleic acid and α-tocopherol are included in an amount of 0 to 15 wt. %, 0 to 25 wt. % and 0 to 25 wt. %, respectively, based on a total lipid weight of the empty liposome, it was confirmed that drug release of the drug carrying liposome is promoted (see Experimental Example 1).

In an embodiment of the present invention, the empty liposome may further include PEGylated phospholipids in order to improve a blood retention time. Alternatively, according to an embodiment of the present invention, it was confirmed that release efficiency is maintained regardless of the presence of DSPE-PEG-2000 (1,2-distearoyl-sn-glycero-3-phosphoethanolamine-N-[carbonyl-methoxy(polyethylene glycol)-2000] in the empty liposome (see Experimental Example 1).

<Empty Liposome Dispersion>

Empty liposome may be present in a dispersion form which includes a buffer such as histidine, phosphate or N-2-hydroxyethylpiperazine-N-2-ethane sulfonic acid (HEPES) as well as sucrose, dextrose or sodium chloride in an aqueous solvent, so as to adjust pH and osmotic pressure to that of a patient fluid when the empty liposome is administered. According to an embodiment of the present invention, it was confirmed that drug release promoting effects are expressed regardless of the presence of histidine/sucrose or phosphate in the dispersion (see Experimental Example 1).

<Method for Preparation of Empty Liposome>

The empty liposome of the present invention may be produced by any method known in the art.

For instance, as described in Example 1, the method may include:
  i) dissolving phospholipids in a solvent such as butyl alcohol, chloroform, ethanol, etc. thus to obtain a mixed solution;
  ii) removing the solvent from the solution in step i);
  iii) adding an aqueous solvent to the residue (lipids) obtained from step ii) to prepare a liposome crude dispersion; and
  iv) reducing and homogenizing a size of the liposome through additional sonication of the crude dispersion obtained from step iii) or the like.

In the above method, the phospholipids in step i) are preferably di-DHA-PC (1,2-didocosahexaenoyl-sn-glycero-3-phosphocholine, 22:6 (Cis) PC), but they are not limited thereto. All of omega-3 fatty acid combined phospholipids (phospholipid combined with omega-3 fatty acid or its derivative) are possibly used.

In step i), any additional component may also be included, although it is sufficient to dissolve omega-3 fatty acid-combined phospholipid alone. Examples of the additional component may include cholesterol, oleic acid or oleic acid-combined phospholipid and α-tocopherol, but they are not limited thereto. In the present invention, a content of the additional components such as cholesterol, oleic acid or oleic acid-combined phospholipid and α-tocopherol may be selected within the range of known compositional ratio of the liposome without limitation thereof. For example, the cholesterol, oleic acid or oleic acid-combined phospholipid and α-tocopherol, respectively, may be included in an amount of 0 to 15 wt. %, 0 to 25 wt. % and 0 to 15 wt. % based on the total lipid weight of the empty liposome.

In step ii), the removal of solvent may be executed by evaporation or lyophilization.

The removal of solvent may be executed by, for example, lyophilization. Lyophilization conditions may be, for example, minus (−) 45° C., but they are not limited thereto.

The evaporation may be leaving as it is or rotational evaporation, and may be executed under known conditions.

In step iii), a component added to the aqueous solvent may include a buffer such as histidine, phosphate or HEPES, and sucrose, dextrose or sodium chloride or the like. One or more among the components described above may be present alone or as a combination thereof in the solvent. These components are mostly selected according to a preparation method of empty liposome and may be used for maintaining stability of the empty liposome and adjusting pH and osmotic pressure to that of a patient body fluid when administering the empty liposome.

In step iii), in order to assist the preparation of the liposome crude dispersion, the solution may be stirred after adding the aqueous solvent. For example, the solution may be stirred at 3,000 rpm for 30 seconds although stirring conditions are not particularly limited.

In step iv), the crude dispersion produced in step iii) may further be subjected to sonication thus to obtain the liposome having reduced and uniform size. With regard to sonication conditions, for example, the spontaneously formed liposome crude dispersion may be homogenized at 130 W using an ultrasonic homogenizer in a water bath form at 37° C. for 1 hour, and then sonicated at 250 W using an ultrasonic sonicator for cell lysis (UCD-200T, Japan) for 7 minutes, but it is not limited thereto. In addition to the water bath sonication as described above, the homogenization process may be replaced with use of a probe sonicator, extruder, high-pressure homogenizer or microfluidizer.

<Procedure for Use of Empty Liposome for Promoting Drug Release>

The liposome containing phospholipid which includes omega-3 fatty acid or its derivative combined thereto, which is obtained by the above method (omega liposome), may be mixed with a drug carrying liposome in different weight ratios (in terms of phospholipid in the drug carrying liposome:omega-3 fatty acid-combined phospholipid in the omega liposome) (exemplified by 1:0.1 to 1:1 in the present invention), followed by further mixing the above mixed solution (for example, stirring at 300 rpm, sonicated by an ultrasonic sonicator at 130 W, or directly mixing) and then administering the mixture so that it can be used for promoting the release of a drug contained in the drug carrying liposome.

<Drug Carrying Liposome>

As used herein, the "drug carrying liposome" refers to a liposome which includes a drug in a space between a phospholipid molecules of the liposome or in an inner aqueous phase of the liposome, and corresponds to a term distinguishable from the empty liposome described above in terms of whether to include a drug or not, and types of the phospholipid forming the same. So far as a drug is carried in a liposome regardless of types of the phospholipid or types of the drug, the liposome may be selected as the drug carrying liposome in the present invention without particular limitation thereof. According to an embodiment of the present invention, in order to investigate whether the promotion of drug release is varied according to the type of phospholipid used for the drug carrying liposome or the carried drug, the empty liposome of the present invention was mixed with both of DOPC-dox liposome, which includes 1,2-dioleoyl-sn-glycero-3-phosphocholine (DOPC) as a major component and carries doxorubicin, and an irinotecan carrying liposome (the liposome made of DSPC as well as ONIVYDE commercially available in the market) and, as a result of the above investigation, it was confirmed that drug release is promoted (see Experimental Example 1).

In the present invention, phospholipid molecules in the drug carrying liposome may be possibly all of neutral lipid, anionic and cationic phospholipids. For example, the neutral lipid may be at least one selected from the group consisting of L-α-phosphatidylcholine (PC), 1,2-dioleoyl-sn-glycero-3-phosphocholine (DOPC), 1,2-distearoyl-sn-glycero-3- phophocholine (DSPC), 1,2-dipalmitoylsn-glycero-3-phophocholine (DPPC) and 1,2-dimyristoyl-sn-glycero-3-phosphocholine (DMPC), wherein the above PC may include PC derived from beans, egg, hardened beans or egg, but it is not limited thereto.

The anionic lipids may include at least one selected from the group consisting of L-α-phosphatidic acid, L-α-phosphatidyl-DL-glycerol, cardiolipin, L-α-phosphatidylinositol, L-α-phosphatidylserine, 1,2-dimyristoyl-sn-glycero-3-[phospho-rac-(1-glycerol)] (DMPG), 1,2-dimyristoyl-sn-glycero-3-[phospho-L-serine] (DMPS), 1,2-dimyristoyl-sn-glycero-3-phosphate (DMPA), 1,2-dioleoyl-sn-glycero-3-[phospho-rac-(1-glycerol)] (DOPG), 1,2-dioleoyl-sn-glycero-3-[phospho-L-serine] (DOPS), 1,2-dioleoyl-sn-glycero-3-phosphate (DOPA), 1,2-dipalmitoyl-sn-glycero-3-[phospho-L-serine] (DPPS), 1,2-dipalmitoyl-sn-glycero-3-phosphate (DPPA), 1,2-distearoyl-sn-glycero-3-[phospho-rac-(1-glycerol)] (DSPG), 1,2-distearoyl-sn-glycero-3-[phospho-L-serine] (DSPS), 1,2-distearoyl-sn-glycero-3-phosphate (DSPA), 1,2-distearoyl-sn-glycero-3-phosphoethanolamine-N-[carboxymethoxy(polyethylene glycol)]), 1-palmitoyl-2-oleoyl-sn-glycero-3-[phospho-rac-(1-glycerol)] (POPG), 1-palmitoyl-2-oleoyl-sn-glycero-3-[phospho-L-serine] (POPS), 1-palmitoyl-2-oleoyl-sn-glycero-3-phosphate (POPA) and oleic acid, but they are not limited thereto.

With regard to the PEGylated phospholipid, a molecular weight of PEG may range from 1,000 to 50,000, 1,000 to 30,000, 1,000 to 20,000, 1000 to 10,000, 1,000 to 8,000, 1,000 to 6,000, 2,000 to 6,000, 3,000 to 6,000, etc., but it is not limited thereto.

The cationic lipids may include at least one selected from the group consisting of 1,2-dioleoyl-sn-glycero-3-ethylphosphocholine (EDOPC), 1,2-dioleoyl-3-trimethylammoniumpropane (DOTAP), dioleoyl glutamide, distearoylglutamide, dipalmitoyl glutamide, dioleoylaspartamide, 1,2-dioleoyl-3-dimethylammonium-propane (DODAP), β-[N—(N,N-dimethylaminoethane)-carbamoyl], 3β-[N—(N',N'-dimethylaminoethane)-carbamoyl] (DC-Chol), dimethyldiochtadecylammonium bromide (DDAB), 1,2-dioleoyl-sn-glycero-3-phosphoethanolamine (DOPE), 1,2-distearoyl-sn-glycero-3-phophoethanolamine (DSPE) and 1,2-dipalmitoyl-sn-glycero-3-phophoethanolamine (DPPE), but they are not limited thereto.

The empty liposome of the present invention is for exhibiting drug release promoting effects by allowing the drug carrying liposome to have a soften membrane structure. Therefore, as the membrane of drug carrying liposome has a rigid structure, effects thereof may be maximized. The drug carrying liposome having a rigid structure may be, for example, a liposome containing phospholipids to which saturated fatty acids are combined. For example, the phospholipids including saturated fatty acids combined thereto may include hydrogenated soy phosphatidylcholine (HSPC), 1,2-dimyristoyl-sn-glycero-3-phosphocholine (DMPC), hydrogenated egg phosphatidylcholine, 1,2-dipalmitoyl-sn-glycero-3-phosphocholine (DPPC) and 1,2-distearoyl-sn-glycero-3-phosphocholine (DSPC), but they are not limited thereto. A ratio of the phospholipid including saturated fatty acid combined thereto may be, for example, more than 0 wt. % to 100 wt. % based on a total weight of the drug carrying liposome, and specifically, the lower limit thereof may be 1%, 5%, 10%, 15%, 20%, 25%, 30%, 35%, 40%, 45%, 50%, 55%, 60%, 65% 70%, etc., while the upper limit thereof may be 100%, 95%, 90%, 85%, 80%, 75%, 70%, etc.

The drug carried in the drug carrying liposome may be any one known in the art without limitation thereof so far as the drug can be carried in the liposome. Diverse drugs corresponding to different diseases may be used without limitation thereof. For example, the drug may include anti-cancer agent. Herein, the cancer may include at least one selected from the group consisting of ovarian cancer, colorectal cancer, pancreatic cancer, gastric cancer, liver cancer, breast cancer, cervical cancer, thyroid cancer, parathyroid cancer, lung cancer, non-small cell lung cancer, prostate cancer, gallbladder cancer, bile duct cancer, non-Hodgkin's lymphoma, Hodgkin's lymphoma, blood cancer, bladder cancer, renal cancer, melanoma, colon cancer, bone cancer, skin cancer, head cancer, uterine cancer, rectal cancer, brain cancer, cancer around anus, fallopian tube carcinoma, endometrial carcinoma, vaginal cancer, vulvar carcinoma, esophageal cancer, small intestinal cancer, endocrine carcinoma, adrenal cancer, soft tissue sarcoma, urethral cancer, penile cancer, urothelial cancer, renal cell carcinoma, renal pelvic carcinoma, central nervous system (CNS) tumor, primary CNS lymphoma, spinal cord tumor, brainstem glioma or Pituitary adenoma. The anticancer agent may include, for example, doxorubicin, irinotecan, etc., or other known anticancer agents may be used without limitation thereof <Drug Delivery System>

An embodiment of the present invention provides a drug delivery system including a membrane-modified liposome, which is formed by bringing a drug carrying liposome into contact with the empty liposome described above.

With regard to the drug delivery system of the present invention, when the empty liposome and the drug carrying liposome are in physical contact with each other, inter-membrane action of phospholipid occurs in both of the above liposomes, such that arrangement of the phospholipid forming a membrane of the drug carrying liposome is varied thus to produce a soft structure. As a result, the drug carried in the drug carrying liposome can be slowly released (see Experimental Example 2). The membrane-modified liposome means a liposome having an altered phospholipid arrangement.

In the present invention, the drug delivery system corresponds to a delivery system that promotes drug release of the drug carrying liposome while overcoming problems of the conventional drug carrying liposome, which promoted drug release by itself, that is, improving the problems of not maintaining the shape of liposome for a long period of time and/or showing sharply reduced blood concentration due to unstable membrane structure.

The drug delivery system of the present invention may store the empty liposome and the drug carrying liposome separately. Further, when the empty liposome is stored at 4° C., an average particle diameter and a poly-dispersity index of the empty liposome are not changed even till 5 months, therefore, it could be confirmed that stability upon storage is retained thus to overcome instability of the conventional drug delivery system (see Experimental Example 2).

Further, the drug delivery system of the present invention has a half-life of 759 minutes, as compared to the blood half-life is 118 minutes when the drug is delivered while not being carried in the liposome, therefore, it could be confirmed that the half-life is significantly increased (see Experimental Example 5). Further, the drug delivery system may significantly deliver the drug into cells. According to an embodiment of the present invention, as compared to a case where doxorubicin is administered in a CAELYX form as a drug carrying liposome, when the same drug is delivered through the drug delivery system of the present invention, it was confirmed that an intracellular influx rate is increased by about 30 times, and in particular, an influx rate to a cell nucleus as a doxorubicin action target is increased by about 192 times (see Experimental Example 4).

The drug delivery system of the present invention may be produced by combining the drug carrying liposome with the empty liposome in appropriate proportions thereof. A weight ratio upon combination may be selected according to types of the drug, use purposes and the like. By interaction between omega-3 fatty acid-combined phospholipid that forms a phospholipid bilayer of the empty liposome and phosphatidylcholine that forms a phospholipid bilayer of the drug carrying liposome, the membrane structure is varied and drug release is controlled, so that the mixing ratio for control of the drug release may be determined with reference to the weight ratio between phosphatidylcholine of the drug carrying liposome and omega-3 fatty acid-combined phospholipid of the empty liposome. For example, the weight ratio of PC in the drug carrying liposome to omega-3 fatty acid-combined phospholipid in the empty liposome may include 1:0.1 to 1, 1:0.2 to 0.8, 1:0.3 to 0.8, 1:0.4 to 0.7, and 1:0.4 to 0.6, but it is not limited thereto.

The membrane-modified liposome may have a diameter of, for example, 70 to 500 nm, 70 to 400 nm, 70 to 300 nm, 100 to 300 nm, etc.

The composition for promoting drug release may be commercially available in a kit form which is provided with a drug carrying liposome and instructions thereof, otherwise, the composition for promoting drug release may also be on sale alone. In the case where the composition is commercially available in the form of kit, according to the instruction included in the kit, the drug release promoting composition is mixed in the drug carrying liposome packaged in a single box, and then used. Alternately, if the composition is sold separately, the drug release promoting composition is firstly separated from the package, and then may be mixed and used with the drug carrying liposome as described below. Accordingly, an embodiment of the present invention provides a method for promoting drug release of a drug carrying liposome, which includes admixing a drug release promoting composition with the drug carrying liposome.

A process of mixing both of these liposomes and bringing the same into physical contact with each other may be selected from conventional methods used by those skilled in the art without limitation thereof. According to an embodiment of the present invention, in the case where, after mixing the empty liposome with the solution including the above drug carrying liposome, the solution is stirred at 3,000 rpm for several seconds ("right after mixing") using a vortex mixer; in the case where the solution is stirred at 200 rpm for 30 minutes after mixing and vortex mixing ("gentle mixing"); otherwise, in the case where the solution is admixed, and then subjected to sonication at 130 W in an ultrasonic sonicator in a water bath form at 37° C. for 30 minutes after vortex mixing ("bath sonication"), a difference in drug release promoting effects was investigated respectively. As a result of the investigation, it was confirmed that drug release promotion occurs in all of the above cases (see Experimental Example 1). However, it is not limited thereto.

The composition for promoting drug release of the present invention may be used for the purpose of treating diverse diseases including cancer according to the types of drugs carried in the drug delivery system. For example, the cancer may include at least one selected from the group consisting of ovarian cancer, colorectal cancer, pancreatic cancer, gastric cancer, liver cancer, breast cancer, cervical cancer, thyroid cancer, parathyroid cancer, lung cancer, non-small cell lung cancer, prostate cancer, gallbladder cancer, bile duct cancer, non-Hodgkin's lymphoma, Hodgkin's lymphoma, blood cancer, bladder cancer, renal cancer, melanoma, colon cancer, bone cancer, skin cancer, head cancer, uterine cancer, rectal cancer, brain cancer, cancer around anus, fallopian tube carcinoma, endometrial carcinoma, vaginal cancer, vulvar carcinoma, esophageal cancer, small intestinal cancer, endocrine carcinoma, adrenal cancer, soft tissue sarcoma, urethral cancer, penile cancer, urothelial cancer, renal cell carcinoma, renal pelvic carcinoma, central nervous system (CNS) tumor, primary CNS lymphoma, spinal cord tumor, brainstem glioma or Pituitary adenoma, but it is not limited thereto. Hereinafter, the present invention will be described in detail with reference to the following examples.

Example 1. Preparation of Empty Liposome (Omega Liposome) and Mixing with Drug Carrying Liposome Omega-3-fatty-acid-bound phospholipids such as di-DHA-PC (1,2-didocosahexaenoyl-sn-glycero-3-phosphocholine (22:6 (Cis) PC), or di-DHA-PE (1,2-didocosahexaenoyl-sn-glycero-3-phosphocholine, 22:6 (Cis) PE) and additional lipids were added to tertiary butyl alcohol in a total amount of 9.1 to 24.5 mg and dissolved therein thus to obtain a mixed solution. The solution was rapidly frozen at minus (−) 80° C., followed by lyophilization in a freeze dryer (EYELA FDU-1200, Japan). To a lipid powdery cake obtained from the drying for 24 hours, 1 ml of 10 mM histidine/10% sucrose was added to hydrate the cake. The product was stirred at 3,000 rpm for 30 seconds to form a coarse liposome dispersion spontaneously. The coarse dispersion was homogenized at 130 W using an ultrasonic bath sonicator at 37° C. for 1 hour, and then sonicated at 250 W using a bath-type sonicator for cell lysis (UCD-200T, Japan) for 7 minutes in order to reduce an average size and increase the homogeneity of the liposomes. Liposomes containing the omega-3-fatty acid-bound phospholipids ("omega liposome") obtained by the above method was mixed with the drug carrying liposome in a varying ratio, followed by stirring at 3,000 rpm for several seconds to prepare a mixture. Further, optionally, the mixture was stirred at 200 rpm and 37° C. for 30 minutes (gentle mixing), otherwise, sonicated at 130 W using a bath sonicator at 37° C. for 30 minutes (bath sonication) in order to promote uniform mixing.

Example 2. In Vitro Drug Release Evaluation Test from Drug Carrying Liposome

After preparing omega liposomes in different constitutional compositions according to the method in Example 1, each omega liposome preparation was mixed with the drug carrying liposome. Omega liposome mixture with doxorubicin carrying liposome (CAELYX, CAELYX Co. Ltd., Janssen Korea) or with irinotecan carrying liposome (ONIVYDE, Servier and in-house prepared irinotecan carrying liposome) was adjusted to 1 mg/ml as doxorubicin and 2.2 mg/ml as irinotecan with a phosphate buffer (pH 7.4). After washing a dialysis bag having a molecular weight cutoff of 12 to 14 kDa with deionized water and plugging one inlet thereof with a closure, 100 µl of the mixture (CAELYX) or 200 µl of the mixture (irinotecan) was introduced into each dialysis bag. Each dialysis bag sealed with a closer was dipped in 100 ml of the phosphate buffer saline at pH 7.4

(CAELYX), 14 ml of the phosphate buffer solution at pH 7.2 (ONIVYDE), or 14 ml of the phosphate buffer solution at pH 5.0 (in-house prepared irinotecan liposome), and then stirred at a rate of 100 rpm in a shaking constant-temperature water bath at 37° C. One milliliter of sample was collected from the dialysate solution for the quantification of concentration of the released drug and the dialysate solution was supplemented with a fresh dialysate solution in the same volume. Amount of doxorubicin released from the drug-carrying liposome was quantified using a fluorescence spectrophotometer (excitation wavelength=466 nm, and emission wavelength=588 nm), while an amount of the released irinotecan was quantified using a spectrophotometer (absorption wavelength=365 nm) or a high pressure liquid chromatography (detection wavelength=254 nm).

Example 3. Analysis of Physical Property Changes of the Drug-Carrying Liposome Due to Omega Liposome Mixing After preparing omega liposome with two compositions (omega liposome 1: 9.6 mg of Di-DHA-PC, 0.8 mg of cholesterol and 0.3 mg of alpha-tocopherol; omega liposome 2: 9.6 mg of Di-DHA-PC, 0.6 mg of oleic acid and 0.3 mg of alpha-tocopherol) by the method of Example 1, each liposome was admixed with CAELYX at a 1:0.5 weight ratio as HSPC in CAELYX:di-DHA-PC in omega liposome. The mixed solution was left in a constant-temperature water bath at 37° C. for 0, 24 and 48 hours, respectively, followed by measuring an average particle diameter using fiber-optics particle analyzer (FPAR-1000, Otsuka Electronics, Japan) by a dynamic light scattering method. At this time, each sample was diluted by 100 times using 10 mM histidine/10% sucrose solution immediately before the measurement.

Figure 6:
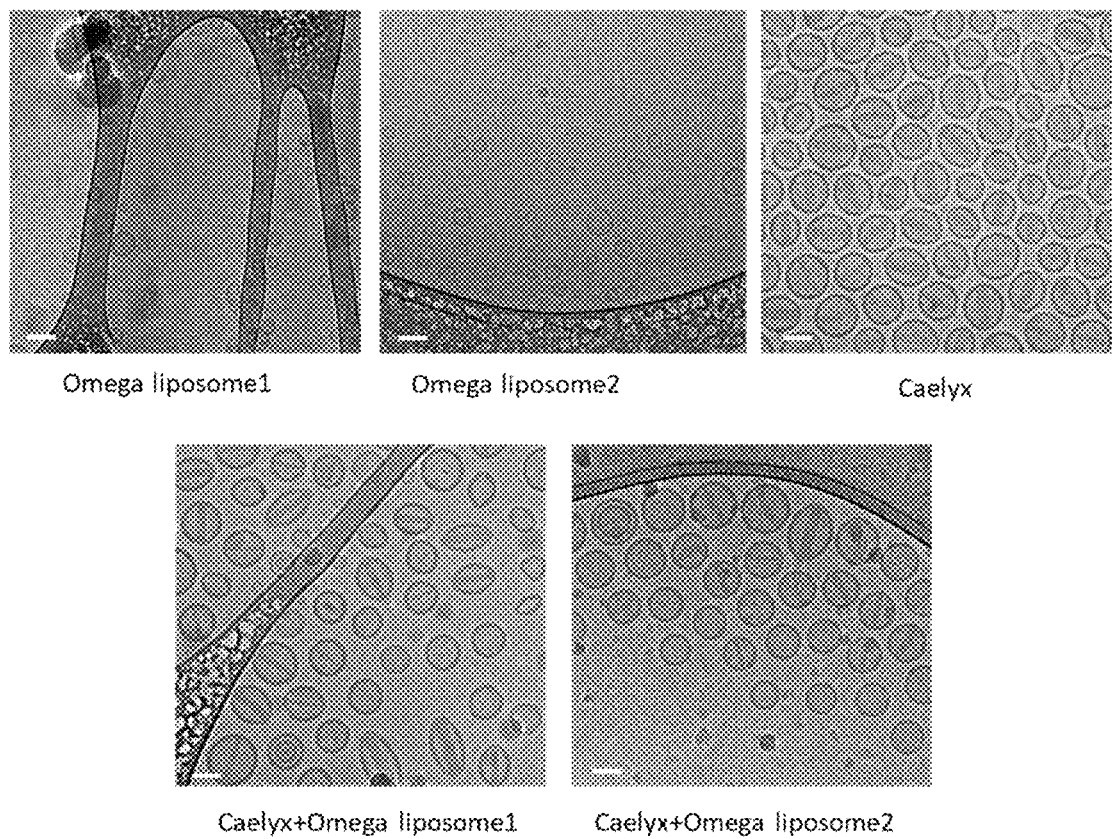
FIG. 6 is images illustrating a shape and a size of the liposome mixture observed through a cryogenic transmission type electron microscope 1 day after mixing the empty liposome with the drug carrying liposome.

To investigate whether the membrane structure is altered by mixing of the drug-carrying liposome and omega liposome, liposome was separately prepared with 9.58 mg/ml of HSPC by the method of Example 1 and admixed with omega liposome at a 1:0.5 weight ratio as HSPC:di-DHA-PC in omega liposome. The liposome mixture was diluted by 5 times with 10 mM histidine/10% sucrose solution, followed by measuring enthalpy variation in the temperature range from 40 to 70° C. while increasing the temperature by 1° C. per minute using a differential scanning calorimeter (Nano DSC, TA instrument, DE, USA). In addition, to investigate the changes in the shape and size of the liposome using a cryogenic transmission type electron microscope, the above CAELYX+omega liposome mixture was overnight left in a water bath at 37° C. The product was diluted by 3 times using 10 mM histidine/10% sucrose solution, and then dropped on a carbon-coated 300 mesh lattice plate. Subsequently, a vitreous ice lattice was moved to an electron microscope using a cryo-holder at a temperature of −170° C. or lower, followed by photographing images at 120 kV by using Tecnai G2 F20 spirit (FEI company, Hillsboro, Oregon, USA). The image photographs were enlarged to 14,500 times (FIG. 6).

Example 4. Assessment of Effects of Omega Liposome on Pharmacological Activity of Drug Carried by Liposome Human-derived HCT-116 colorectal cancer cells or mouse-derived B16-F10 melanoma cells were inoculated at 2.5 to 3×10³ cells/well density in a 96-well culture plate, and then incubated overnight. To assess anticancer effects of a liposome-carried anticancer drug, omega liposome was prepared by the method of Example 1, followed by mixing with CAELYX according to the method of Example 1. The liposome mixture was diluted with cell culture medium to become 10 to 10,000 nM as doxorubicin, followed by incubation with cancer cells for 48 hours. Then, after removing the medium, 3-(4,5-dimethylthiazol-2-yl)-2,5-diphenyltetrazolium bromide (MTT) solution was added at a concentration of 0.5 mg/ml, followed by incubation for 2 hours. After removing the solution from the plate, the remaining crystals were dissolved with 100 µl of dimethyl sulfoxide (DMSO). Using a microplate spectrophotometer, absorbance at a wavelength of 540 nm was measured, and then a growth rate of cells was converted in a percentage (%) based on a growth rate of cells untreated with an anticancer agent.

Example 5. Experiment for Assessment of Intracellular and Intranuclear Drug Uptake In order to assess effects of omega liposome mixing on the extent of intracellular uptake of the drug carried by liposome, human derived HCT-116 colorectal cancer cells were inoculated at 1×10⁶ cells/well density in a 6-well culture plate. On the next day, CAELYX or a CAELYX+omega liposome mixture corresponding to 20 or 60 µg/ml of doxorubicin was incubated with cells for 2 hours. After washing the cells twice with cold phosphate buffer solution at pH 7.4, the cells were removed, and then put into a tube. Thereafter, the tube was centrifuged at a rate of 13,200 rpm for 5 minutes to settle down the cells. After removing the supernatant, 100 µl of 10% sodium dodecyl sulfate (SDS) in distilled water was added to the remaining pellets, followed by crushing the same using an ultrasonic sonicator for 6 minutes. To the mixture, 200 µl of acetonitrile was added, followed by centrifugation in a centrifuge at 13,200 rpm for 5 minutes, thus to separate protein pellets therefrom. After collecting the supernatant, a doxorubicin concentration in the supernatant, that is, an amount of doxorubicin introduced into the cells was quantified through a fluorescence spectrophotometer.

In order to assess the effect of omega liposome mixing on the extent of drug uptake into a nucleus, an intracellular drug action site, human derived HCT-116 colorectal cancer cells were inoculated at 1×10⁶ cells/well density in a 6-well tissue culture plate. On the next day, a CAELYX or CAELYX+ omega liposome mixture corresponding to 20 or 100 µg/ml of doxorubicin was incubated with cells for 3 hours. After washing the cells twice with cold phosphate buffer solution at pH 7.4, the cells were removed, and then put into a tube. Thereafter, the tube was centrifuged in a centrifuge at a rate of 13,200 rpm for 5 minutes to settle the cells. After removing the supernatant, the remaining pellets were re-suspended in a hypotonic buffer (20 mM Tris (pH 7.4) containing 10% NP-40, 10 mM NaCl and 3 mM MgCl$_2$). Following this, the product was centrifuged at a rate of 3,000 rpm to separate the supernatant containing a cytoplasm fraction from the pellets containing a nucleus fraction. The obtained pellets were re-suspended in a cell extraction buffer of Invitrogen Co., stirred at 3,000 rpm for 1 minute, and centrifuged at a rate of 13,250 rpm and 4° C. for 30 minutes to obtain the supernatant corresponding to the nucleus fraction. A doxorubicin concentration in each of the cytoplasm fraction and the nucleus fraction was quantified using a fluorescence spectrophotometer while a protein concentration of each fraction was quantified using BCA assay kit.

Example 6. Pharmacokinetic Assessment in a Rat Model

Eight week-old SD rats were randomly divided into three groups (doxorubicin, CAELYX and CAELYX+omega liposome), respectively. Each group was anesthetized with 100 mg/kg of ketamine, followed by inserting polyethylene tubes into the jugular vein and the carotid for drug injection and blood gathering, respectively. To the three groups, the doxorubicin solution, CAELYX and a CAELYX+omega liposome mixture were intravenously administered through the jugular vein at a 5 mg/kg doxorubicin dose. Thereafter, 120 μL of blood was collected at 1, 5, 15, 30, 60, 120, 180, 240, 360, 480, 720, 960, 1,440, 2,160 and 2,880 minutes, respectively, and centrifuged, followed by gathering 50 μl of plasma to analyze a doxorubicin concentration through HPLC. In order to prevent blood coagulation after blood gathering, 0.3 mL of physiological saline for injection containing 20lU of heparin was flushed. In addition, after drug administration, urine was collected up to 24 hours and measured for volume.

For quantification of doxorubicin concentration in plasma and urine, 100 μL of acetonitrile and 15 μL of 15 μg/mL daunorubicin (internal standard material) were added and well mixed in 50 μL of the plasma or urine, and then centrifuged at 13,000 rpm for 5 minutes to remove the plasma protein. Thereafter, 100 μL of the supernatant was introduced into HPLC column (reversed phase column, particle size 5 inner diameter 4.6 mm, length 250 mm). Mobile phase composed of 68:32 (v/v) mixture of water (pH 2.60) and acetonitrile was used at a flow rate of 1 mL/min. For detection of drugs, a fluorescence detector was used wherein excitation (Ex) wavelength is 475 nm and emission (Em) wavelength is 555 nm. Retention times of doxorubicin and daunorubicin were 4.1 minutes and 6.8 minutes, respectively.

The plasma concentration of doxorubicin quantified by HPLC assay was used to calculate pharmacokinetic parameters using WinNonlin program. For statistical analysis of the pharmacokinetic parameters among the above three groups, Tukey's test was carried out after performing analysis of variance (ANOVA), wherein $P<0.05$ is considered to be statistically significant.

Example 7. Experiment for Assessment of Tissue Distribution of Anticancer Drugs in a Tumor-Grafted Mouse Model In order to investigate effects of the omega liposome mixing on the tissue distribution of the drug carrying liposome in a tumor-grafted animal model, $5\times10^6$ HCT-116 colorectal cancer cells were subcutaneously injected into the right each BALB/c nude mouse. When a volume of the grafted tumor reached about 250 to 300 mm$^3$, the mice were randomly divided into two groups, followed by intravenous administration of CAELYX and a CAELYX+omega liposome mixture equivalent to 4 mg/kg doxorubicin into tail veins, respectively. Twenty four hours and 48 hours after administration, tumor tissues and major organs were removed from each mouse. Fluorescent images of doxorubicin present in each tissue were ex vivo analyzed by using IVIS Lumina III In Vivo Imaging System (Perkin Elmer, USA). Fluorescence intensities were measured through Livingimage® software version 4.7.3. For each statistical analysis between the above two groups, a student T-test was performed wherein $P<0.05$ is considered to have statistical significance.

Example 8. Experiment for Assessment of Anticancer Activity in Tumor-Grafted Mouse Model In order to investigate effects of the omega liposome mixing on anticancer activity of the drug carrying liposome in a tumor animal model, $5\times10^6$ human-derived HCT-116 colorectal cells were subcutaneously injected into the right thigh flank of each BALB/c nude mouse. When a volume of the grafted tumor reached about 100 mm$^3$, the mice were randomly divided into four groups (n=4 to 5) (Group 1: histidine/sucrose solution (control), Group 2: CAELYX, 3: CAELYX+omega liposome mixture, and Group 4: omega liposome). Each administration solution was intravenously administered twice into tail veins in each group with an equivalent dose of 4 mg/kg doxorubicin (day 0 and day 5). Every other day, the length (long axis) and width (short axis) of tumors were measured by using a digital caliper while the body weight was measured using a scale. Tumor volume was calculated according to the following equation: tumor volume (mm$^3$)=½×long axial length×(short axial length). On day 22 after administration, the tumor tissues were obtained from the mice to measure weights thereof. For each statistical analysis among the above four groups, Tukey's test was carried out after performing analysis of variance (ANOVA), wherein $P<0.05$ is considered to have statistical significance.

Experimental Example 1. Results of Drug Release Experiment

Figure 1:
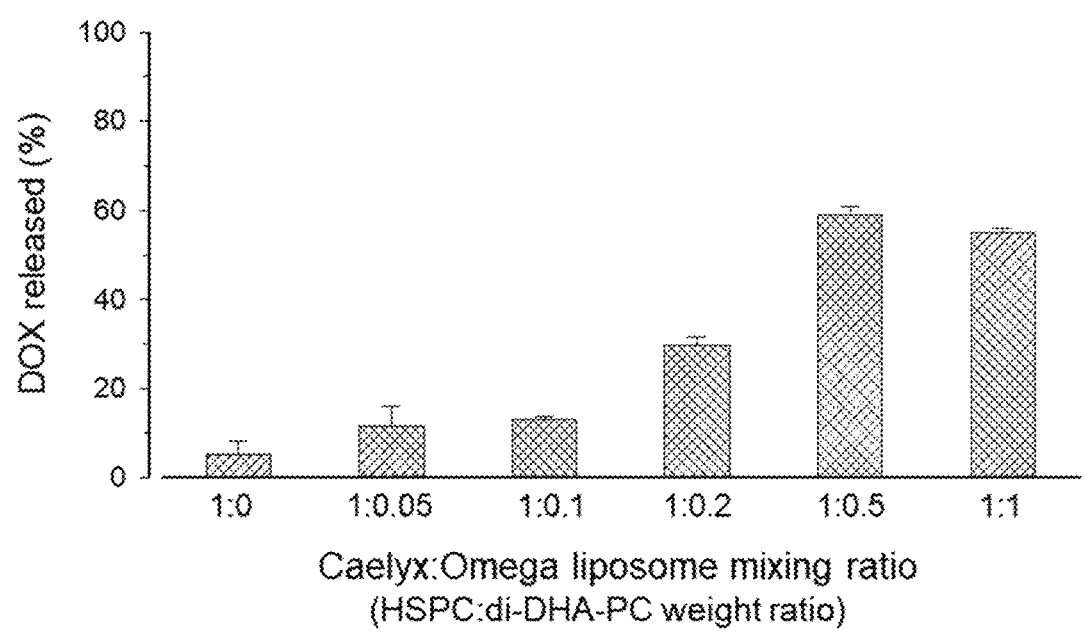
FIG. 1 is a graph illustrating a mixing ratio-dependent doxorubicin release when mixing a drug carrying liposome with an empty liposome.

After preparing the omega liposome using a total 10.7 mg of lipids composed of 9.6 mg of Di-DHA-PC, 0.8 mg of cholesterol and 0.3 mg of alpha-tocopherol according to the method of Example 1, the prepared liposome was mixed with doxorubicin-loaded liposome (CAELYX) by the method of Example 1. Referring to FIG. 1, the doxorubicin concentration released from several mixed solutions with different mixing ratios of CAELYX:omega liposome in a range of 1:0 to 1:1 weight ratio in terms of PC in CAELYX: di-DHA-PC in Omega liposomes were determined according to the method of Example 2. The results shows that the drug release from CAELYX increased in a mixing ratio-dependent manner, and then was saturated when the weight ratio is 1:0.5. In this case, the percentage of drug release increased by 6.8-fold compared to that without omega liposome mixing (FIG. 1).

Figure 2:
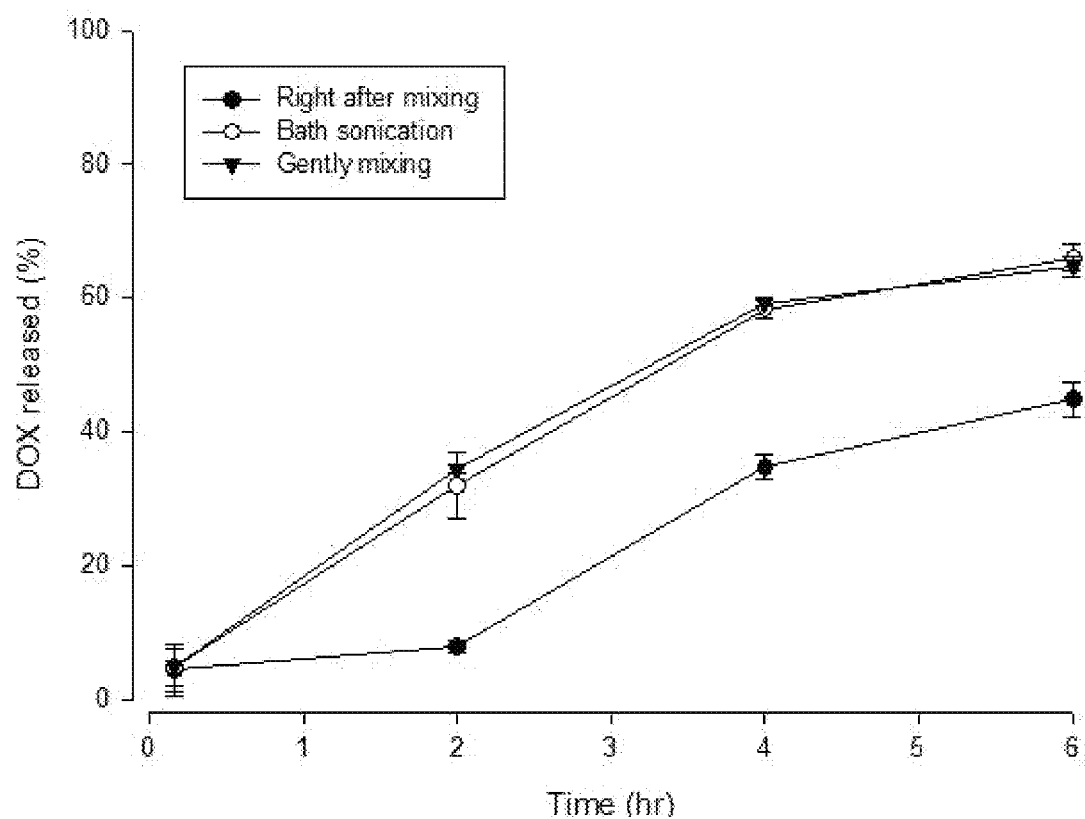
FIG. 2 is a graph illustrating variations in drug release profile according to a method of mixing the drug carrying liposome with the empty liposome.

In order to investigate the effect of method mixing drug carrying liposome and omega liposome on the drug release profile, the drug carrying liposome (CAELYX) was mixed with the omega liposome in the experiment shown in FIG. 1 in a fixed ratio of 1:0.5 (PC of CAELYX:PC of omega liposome) by the method of Example 1. 'Right after mixing' method and 'gentle mixing' method as described in Example 1 exhibited similar or slightly reduced drug release inducing effects as compared to the 'bath sonication' method (FIG. 2). It implies that drug release inducing effects can be obtained even without using a device such as the ultrasonic sonicator or the like.

In order to investigate the changes in drug release profile of the drug carrying liposome in relation to whether the omega liposome is mixed or not, as well as constitutional composition thereof, the drug carrying liposome (CAELYX) and the omega liposome with different compositions prepared by the method of Example 1 were mixed at a weight ratio of 1:0.5 to 1:1 in terms of PC in CAELYX:omega-3-fatty acid-bound phospholipid in omega liposome (Table 1).

TABLE 1

| Release test sample | Lipid composition of empty liposome (weight ratio, mg) | Weight % of each component | | | | Mixing ratio* | Component of aqueous phase of liposomes |
|---|---|---|---|---|---|---|---|
| | | omega-3-fatty acid-bound phospholipid | cholesterol | α-tocopherol | oleic acid or oleic acid-bound phospholipid | | |
| doxorubicin solution | | | | | | | |
| Caelyx alone | | | | | | | |
| Omega liposome (di-omega-3-fatty acid-bound phospholipid)-mixed | di-DHA-PC alone (9.6) | 100 | — | — | — | 1:0.5 | histidine/sucrose |
| | di-DHA-PC alone (9.6) | 100 | — | — | — | 1:0.5 | histidine/sucrose |
| | di-DHA-PC:CHOL (9.6:0.8) | 92.3 | 7.7 | — | — | 1:0.5 | histidine/sucrose |
| | di-DHA-PC:CHOL (9.6:1.6) | 85.7 | 14.3 | — | — | 1:0.5 | histidine sucrose |
| | di-DHA-PC:CHOL (9.6:3.2) | 75 | 25 | — | — | NA | phosphate/sodium chloride |
| | di-DHA-PC:α-tocopherol (9.6:1.6) | 85.7 | — | 14.3 | — | 1:0.5 | phosphate/sodium chloride |
| | di-DHA-PC:CHOL:α-tocopherol (9.6:0.8:0.3) | 89.7 | 7.5 | 2.8 | — | 1:0.5 | histidine/sucrose |
| | di-DHA-PC:CHOL:α-tocopherol:DSPE-PEG 2000 (9.6:0.8:0.3:3.2) | 69.1 | 5.8 | 2.2 | — | 1:0.5 | histidine/sucrose |
| | di-DHA-PC:EDOPC:CHOL:α-tocopherol (10.9:0.5:2.1:0.6) | 77.3 | 14.8 | 4.3 | — | 1:0.5 | histidine/sucrose |
| | di-DHA-PC:Soy-PC:CHOL:α-tocopherol (10.9:10.9:2.1:0.6) | 44.5 | 8.6 | 2.4 | — | 1:0.6 | histidine/sucrose |
| | di-DHA-PC:oleic acid (9.6:3.1) | 75.6 | — | — | 24.4 | 1:1 | histidine/sucrose |
| | di-DHA-PC:oleic acid:α-tocopherol (9.6:0.6:0.3) | 91.4 | — | 2.9 | 5.7 | 1:0.5 | phosphate/sodium chloride |
| | di-DHA-PC:oleic acid:α-tocopherol (9.6:1.2:0.3) | 86.5 | — | 2.7 | 10.8 | 1:1 | phosphate/sodium chloride |
| | di-DHA-PC:DOPE:α-tocopherol (9.6:0.6:0.3) | 91.4 | — | 2.9 | 5.7 | 1:0.5 | phosphate/sodium chloride |
| | di-DHA-PE:oleic acid:α-tocopherol (9.6:1.6:0.3) | 83.5 | — | 2.6 | 15 | 1:1 | phosphate/sodium chloride |
| | di-EPA-PC:CHOL:α-tocopherol (9.6:0.8:0.3) | 89.7 | 7.5 | 2.8 | — | 1:0.5 | histidine/sucrose |
| other liposome-mixed | mono-DHA-PC:CHOL:α-tocopherol (9.6:0.8:0.3) | — | | | | 1:0.5 | histidine/sucrose |
| | di-DA-PC:CHOL:α-tocopherol (9.6:0.8:0.3) | — | | | | 1:0.5 | histidine/sucrose |
| | DOPC:CHOL (9.6:3.2) | — | | | | 1:0.5 | histidine/sucrose |
| | DOPC:oleic acid:α-tocopherol (9.6:0.6:0.3) | — | | | | 1:0.5 | phosphate/sodium chloride |

TABLE 1-continued

| Release test sample | Lipid composition of empty liposome (weight ratio, mg) | Mean size (nm) | Release (%) 2 hour | 4 hour | 6 hour | 8 hour | 24 hour |
|---|---|---|---|---|---|---|---|
| doxorubicin solution | | | 47.4 ± 1.3 | 72.8 ± 3.2 | 81.6 ± 2.1 | | |
| Caelyx alone | | | 3.9 ± 1.4 | 4.4 ± 1.9 | 7.9 ± 4.9 | 10.6 ± 0.4 | 10.1 ± 1.5 |
| Omega liposome (di-omega-3-fatty acid-bound phospholipid)-mixed | di-DHA-PC alone (9.6) | 119 | 31.3 ± 2.7 | 55.1 ± 4.0 | 60.5 ± 2.3 | 66.6 ± 1.6 | N/A |
| | di-DHA-PC alone (9.6) | 356 | 19.3 ± 0.5 | 32.6 ± 0.8 | 37.6 ± 3.5 | N/A | 51.6 ± 1.7 |
| | di-DHA-PC:CHOL (9.6:0.8) | N/A | 40.3 ± 1.6 | 45.1 ± 4.5 | 53.7 ± 5.6 | 52.9 ± 2.4 | N/A |
| | di-DHA-PC:CHOL (9.6:1.6) | 219 | 11.5 ± 0.5 | 32.4 ± 2.4 | 37.6 ± 2.0 | 36.0 ± 2.1 | N?A |
| | di-DHA-PC:CHOL (9.6:3.2) | 1017 | N/A | N/A | N/A | N/A | N/A |
| | di-DHA-PC:α-tocopherol (9.6:1.6) | 219 | 22.9 ± 4.0 | 52.9 ± 3.3 | 54.3 ± 1 | 55.5 ± 5.4 | N/A |
| | di-DHA-PC:CHOL:α-tocopherol (9.6:0.8:0.3) | 129 | 24.7 ± 7.4 | 53.4 ± 2.1 | 53.6 ± 5.8 | N/A | 63.4 ± 3.1 |
| | di-DHA-PC:CHOL:α-tocopherol:DSPE-PEG 2000 (9.6:0.8:0.3:3.2) | 272 | 30.6 ± 2.7 | 47.9 ± 4.2 | 59.3 ± 2.8 | 54.2 ± 3.7 | 56.3 ± 2.2 |
| | di-DHA-PC:EDOPC:CHOL:α-tocopherol (10.9:0.5:2.1:0.6) | 83 | 13.5 ± 1.6 | 27.6 ± 5.4 | 34.1 ± 3.3 | 35.5 ± 3.3 | 40.4 ± 3.2 |
| | di-DHA-PC:Soy-PC:CHOL:α-tocopherol (10.9:10.9:2.1:0.6) | 303 | 7.8 ± 0.2 | 10.5 ± 1.0 | 9.1 ± 0.6 | 15.5 ± 0.1 | 45.7 ± 1.9 |
| | di-DHA-PC:oleic acid (9.6:3.1) | N/A | 40.6 ± 2.7 | 53.3 ± 6.4 | 71.6 ± 2.3 | 72.4 ± 5.6 | 71.8 ± 1.2 |
| | di-DHA-PC:oleic acid:α-tocopherol (9.6:0.6:0.3) | 85 | 39.7 ± 1.4 | 60.6 ± 1.9 | 56.3 ± 5.8 | 62.5 ± 8.1 | 76.8 ± 5.7 |
| | di-DHA-PC:oleic acid:α-tocopherol (9.6:1.2:0.3) | 115 | 23.9 ± 0.3 | 59.0 ± 5.0 | 69.1 ± 0.8 | 77.5 ± 3.1 | 82.5 ± 3.3 |
| | di-DHA-PC:DOPE:α-tocopherol (9.6:0.6:0.3) | N/A | 32.7 ± 5.8 | 51.6 ± 8.2 | 93.9 ± 10.4 | 98.3 ± 6.7 | 96.2 ± 6.2 |
| | di-DHA-PE:oleic acid:α-tocopherol (9.6:1.6:0.3) | 174 | 12.3 ± 0.5 | 32.1 ± 2.0 | 42.1 ± 1.0 | 62.5 ± 3.3 | NA |
| | di-EPA-PC:CHOL:α-tocopherol (9.6:0.8:0.3) | N/A | 41.0 ± 1.4 | 45.2 ± 2.5 | 57.2 ± 5.8 | 61.7 ± 1.4 | N/A |
| other liposome-mixed | mono-DHA-PC:CHOL:α-tocopherol (9.6:0.8:0.3) | 164 | 2.1 ± 0.7 | 4.1 ± 0.4 | 3.6 ± 0.4 | 3.5 ± 0.3 | N/A |
| | di-DA-PC:CHOL:α-tocopherol (9.6:0.8:0.3) | 168 | 5.3 ± 1.4 | 6.7 ± 1.1 | N/A | 6.2 ± 2.8 | 8.5 ± 1.6 |
| | DOPC:CHOL (9.6:3.2) | 620 | 1.5 ± 0.2 | 2.9 ± 0.9 | 3.4 ± 0.2 | N/A | 3.0 ± 0.1 |
| | DOPC:oleic acid:α-tocopherol (9.6:0.6:0.3) | 112 | 5.8 ± 0.8 | 6.6 ± 0.6 | 8.5 ± 2.7 | 7.8 ± 1.3 | 13.0 ± 2 |

*weight ratio of PC in drug carrying liposome to omega-3-fatty acid-bound phospholipid in omega liposome Measuring the drug release by the method of Example 2 showed that CAELYX alone showed only 10% drug release even till 24 hours. In contrast, when the omega liposome containing di-DHA-PC was mixed, the drug was time-dependently released: 9.1 to 60.5% was released during 6-hour incubation and 40.4% to 63.4% was released during 24-hour incubation. In the case that di-DHA-PC is contained in an amount of 44 wt. % of the total lipid of the omega liposome, drug release inducing effect was still observed although the effect was slightly less than omega liposomes containing more than 50 wt % di-DHA-PC. If the omega liposome contains more than 44% of di-DHA-PC, drug release inducing effects were observed even when other components such as cholesterol, DSPE-PEG-2000 (1,2-distearoyl-sn-glycero-3-phosphoethanolamine-N-[amino (polyethylene glycol)-2000], oleic acid, oleic acid-bound phospholipid, etc. were included in the total lipid. Further, in case of liposome prepared of di-DHA-PC 100%, liposomes made into smaller sized ones (119 nm) through homogenization process were more effective in inducing drug release than 365 nm sized, coarsely dispersed liposomes. Liposome containing di-DHA-PE instead of di-DHA-PC was also effective in inducing drug release. Meanwhile, liposomes containing mono-DHA-PC (1-stearoyl-2-docosahexaenoyl-sn-glycero-3-phosphocholinemono-DHA-PC, 18:0-22:6 PC), in which only one of two carbon chains consists of omega-3-fatty acid, DA-PC (1,2-diarachidonoyl-sn-glycero-3-phosphocholine, 20:4(Cis) PC), in which both of the two strands consist of omega-6-fatty acids and DOPC (1,2-dioleoyl-sn-glycero-3-phosphocholine, 18:1 PC) all exhibited no such drug release inducing effects, indicating that the drug release inducing effect is specific to liposomes containing phospholipids in which two strands are all omega-3-fatty acids (Table 1). Further, in order to examine the possibility that the drug release promoting effect of omega liposomes may not be exhibited due to the adsorption of serum proteins to the liposome surface when liposomes are administered in vivo, drug release profile from CAELYX mixed with di-DHA-PC omega liposome (di-DHA-PC:CHOL:α-tocopherol=9.6:0.8:0.3 mg) in the presence of 50% serum were subjected to experiments under the conditions as illustrated in Table 1. As a result, drug release was still induced in a time-dependent manner (FIG. 3), implying that the drug release inducing effects of the omega liposome can also be expected in vivo.

In order to investigate whether the drug release promoting effects of the omega liposome are influenced by types of PC in the drug carrying liposome, a doxorubicin carrying liposome (DOPC-DOX-liposome) was in house-prepared by adopting DOPC (1,2,-dioleoyl-sn-glycero-3-phosphocholine) as a major component instead of HSPC in CAELYX, while the rests of the lipid composition kept the same as CAELYX. Even when DOPC-DOX-liposome was 1:0.5 weight ratio (PC in drug carrying liposome:PC in omega liposome) mixed with omega liposome with the composition used in FIG. 3, drug release promoting effects could be observed. Further, in order to investigate whether effects of omega liposome exert only in the case where the carried drug is doxorubicin, irinotecan-carrying liposome (ONIVYDE) and the omega liposome were mixed at a 1:0.5 weight ratio in terms of PC in ONIVYDE to PC in omega liposome, and drug release was investigated at pH 7.4 by the method of Example 2. As a result, time-dependent drug release inducing effects were observed. When irinotecan-carrying DSPC liposome was prepared with the same lipid composition as ONIVYDE and mixed with omega liposome in a weight ratio of 1:0.4 and 1:0.6 (PC in drug carrying liposome:PC in omega liposome), and then drug release rate at pH 5.0 was investigated, mixing ratio-dependent drug release inducing effects were observed (Table 2).

TABLE 2

| Types of drug carrying liposome | Mixing PC ratio | Drug released (%) | | | | | |
|---|---|---|---|---|---|---|---|
| | | 2 h | 4 h | 6 h | 24 h | 48 h | 72 h |
| DOPC-DOX-Liposome | 1:0.5 | 0.1 ± 0.6 6.2 ± 1.6 | 3.2 ± 2.3 28.5 ± 0.9 | 3.8 ± 0.7 34.8 ± 0.9 | | | |
| ONIVYDE | 1:0.5 | NA* NA* | NA* NA* | NA* NA* | 37.9 ± 4.2 56.5 ± 6.5 | 56.3 ± 7.0 91.8 ± 0.9 | 68.9 ± 7.1 |
| Irinotecan-DSPC-liposome | 1:0.4 1:0.6 | 3.5 ± 0.9 16.4 ± 1.4 31.7 ± 3.9 | 3.4 ± 0.5 30.1 ± 3.7 52.1 ± 3.1 | 5 | 16.1 ± 6.5 49.5 ± 3.6 85.9 ± 4.1 | 23.8 ± 9.8 55.1 ± 1.8 83.4 ± 2.0 | 32.1 ± 2.3 59.9 ± 7.6 87.4 ± 5.5 |

*Less than detection limit

Figure 4:
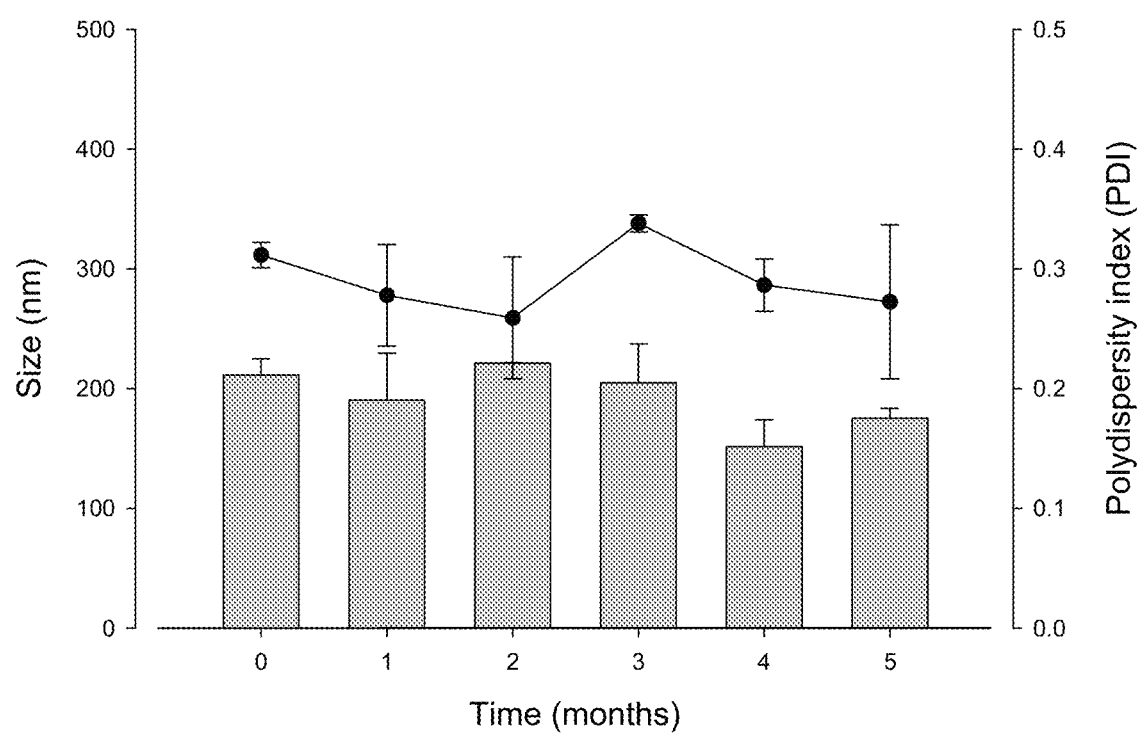
FIG. 4 is a graph illustrating storage stability of the empty liposome.

Meanwhile, when omega liposome was stored at 4° C. for 5 months, the average particle diameter and the polydispersity index (PDI) measured by dynamic light scattering method in Example 3 were not changed. Therefore, it could be confirmed that omega liposome itself is stable during storage (FIG. 4).

Experimental Example 2. Results of Assessment of Physical Changes in Drug-Carrying Liposome by Omega Liposome Mixing After omega liposome in Example 3 was prepared according to the method of Example 1, it was mixed with CAELYX or with in house-prepared liposome composed of 9.58 mg/ml HSPC (PC used in CAELYX), and then changes in the size and morphology of the drug carrying liposome (CAELYX) were investigated according to the method of Example 3.

Figure 5:
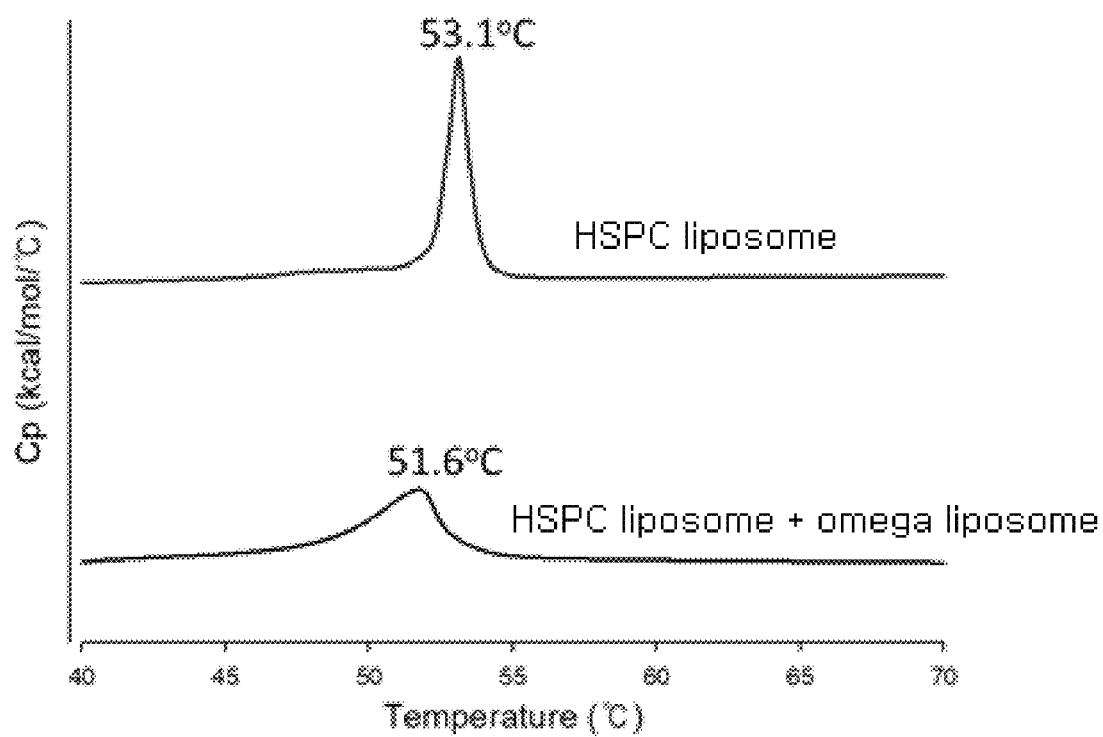
FIG. 5 is a graph illustrating effects on the phase transition temperature of HSPC when mixing a liposome composed of phospholipid HSPCs with the empty liposome.

When enthalpy changes in in house-prepared HSPC liposome mixed with omega liposome were monitored using Nano DSC instrument, the phase transition temperature of HSPC liposome lowered from 53.1° C. to 51.6° C. due to the omega liposome mixing, the width of the peak appearing at the phase transition temperature was widened, and the enthalpy also decreased (FIG. 5). These results are caused by a decrease in the interaction between HSPC molecules because lipids in omega liposomes are inserted between the HSPC molecules constituting the phospholipid bilayer. That is, it is suggested that the membrane-to-membrane interaction occurs by mixing the above two different liposomes, thereby increasing the membrane permeability of HSPC liposomes.

Morphology and size of CAELYX, omega liposome and the CAELYX+omega liposome mixture were investigated by a cryogenic transmission electron microscope according to the method of Example 3. The scale bar denotes 50 nm (FIG. 6). CAELYX liposomes were observed mostly as a spherical vesicle, in which rod type drug crystals adhered to a vesicle membrane at both ends. The size of omega liposome appeared to be about 20 to 60 nm, which was smaller than that measured by a light scattering method. It is probable that the adsorption of water molecules on the surface of the liposome tends to increase a size when measured by the light scattering method, and for the omega liposome, the above tendency is great. The shape of CAELYX liposomes observed after mixing omega liposome was converted into a disk shape, and then elongated, otherwise, became an empty vesicle shape due to the release of doxorubicin to an outside. It seems likely that the inter-membrane interaction between omega liposome and the drug carrying liposome alters the membrane structure of drug carrying liposome, as well as releasing the drug from it.

Figure 7:
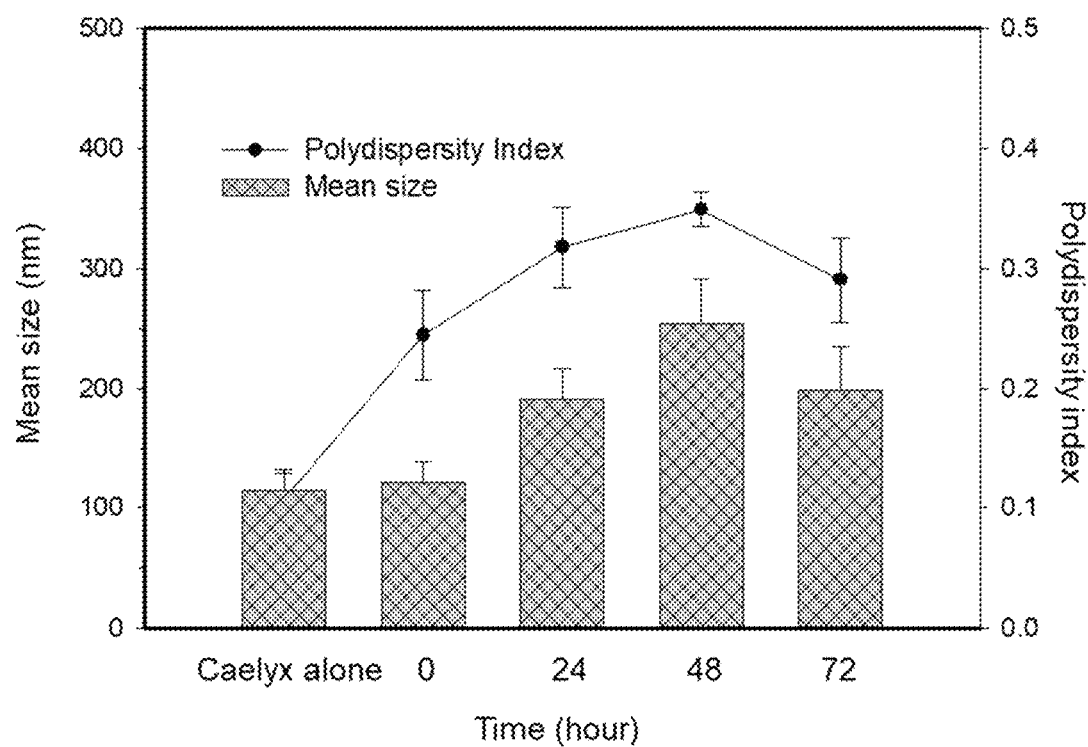
FIG. 7 is a graph illustrating variations in average particle diameter of the drug carrying liposome and poly-dispersity index (PDI) over time after mixing the empty liposome with the drug carrying liposome.

Meanwhile, the changes in the average particle diameter and poly-dispersity index (PDI) of the liposome over time were investigated by the light scattering method. The average particle diameter of CAELYX (rod) the polydispersity index (PDI) increased as the incubation time increased (FIG. 7). These results imply that liposome-to-liposome membrane interaction occurred after mixing process, resulting in drug carrying liposomes slightly enlarged and more heterogenous. Taken together, these data indicate that the effect of omega liposome inducing the drug release from drug-carrying liposome is due to the liposome-to-liposome membrane interaction.

Experimental Example 3. Assessment of Omega Liposome Mixing-Induced Changes in Pharmacological Activity of Drug Carried by Liposome In order to identify effects of omega liposome mixing on the pharmacological activity of anticancer drugs carried by liposome, omega liposome 1 and 2 indicated in Example 3 were mixed with CAELYX or doxorubicin solution (CAELYX:omega liposome=1:0.5 to 0.7 in terms of a weight ratio of CAELYX PC:Omega liposome PC). With liposome mixtures subjected to 'gentle mixing' or 'bath sonication' as indicated in Example 1, anticancer activity of them was evaluated according to the method of Example 4.

Figure 8A:
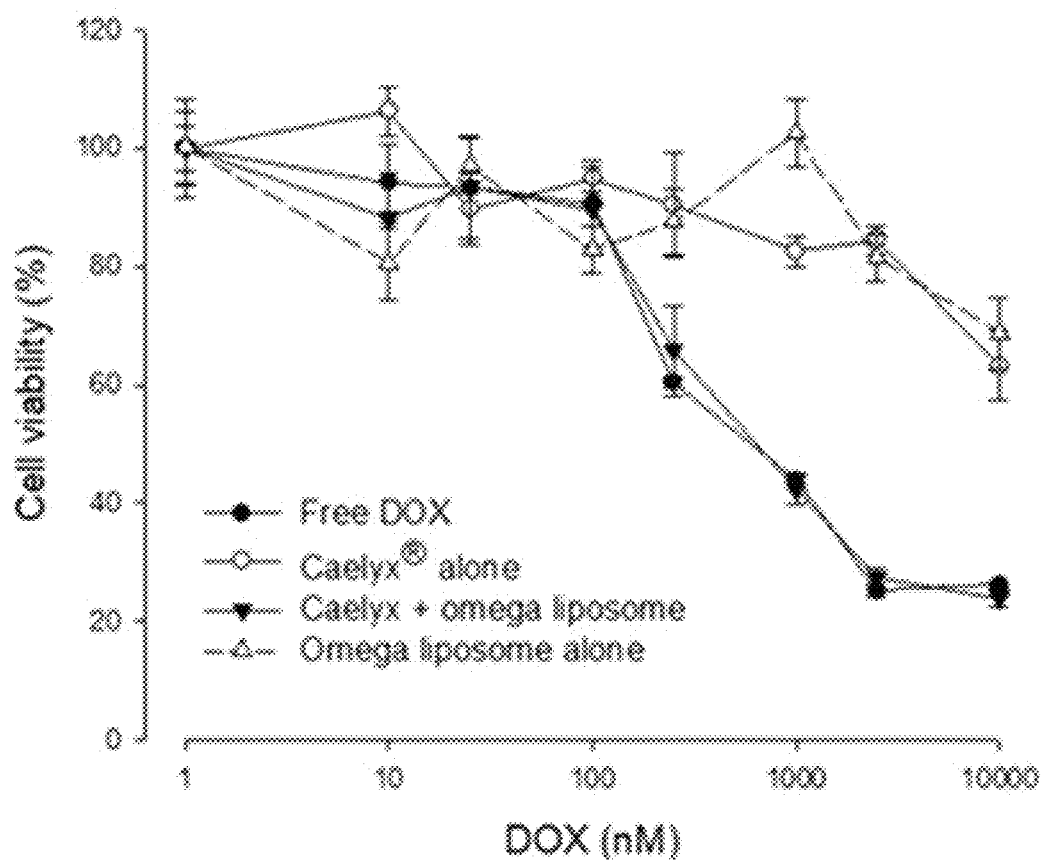
FIGS. 8A and 8B are graphs illustrating effects of the mixing of the drug carrying liposome with the empty liposome on anticancer activity of the carried drug.
Figure 8B:
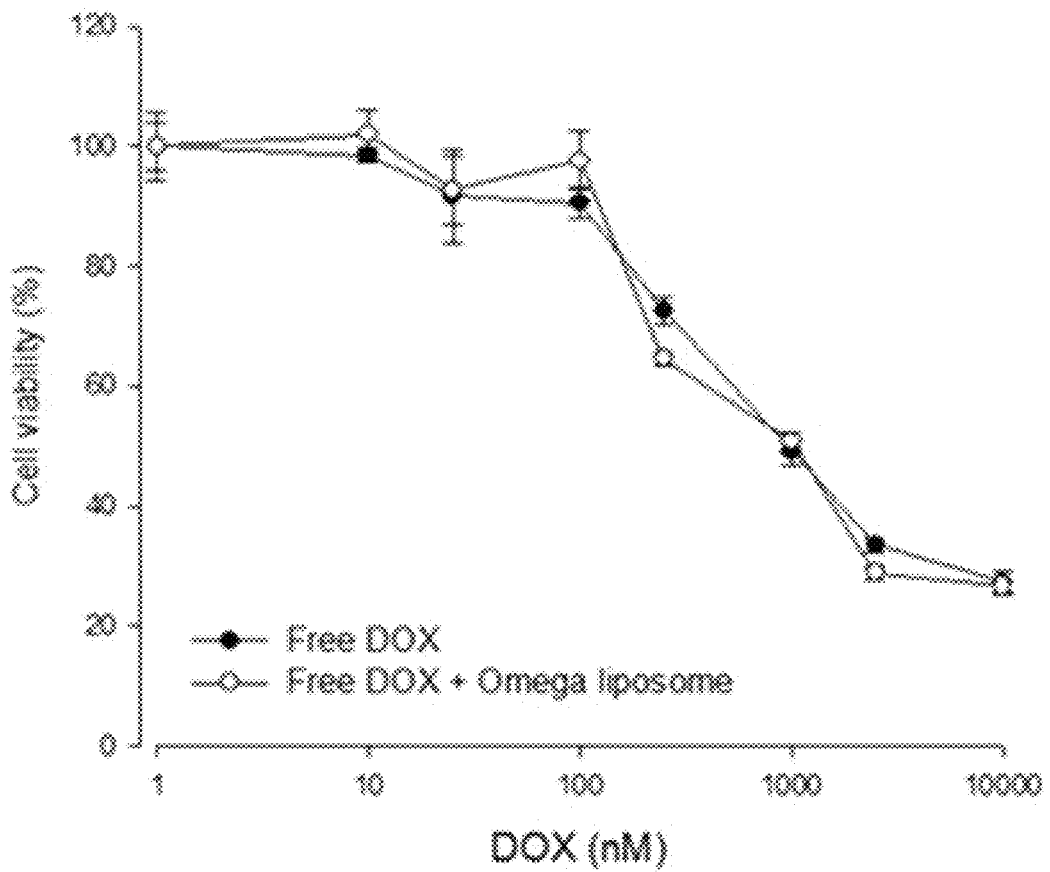

As a result, regardless of the mixing methods, CAELYX mixed with omega liposome showed remarkably higher cancer cell growth inhibitory effects at the same doxorubicin concentration compared to CAELYX not mixed with the omega liposome. The omega liposome effect was dependent on the mixing ratio: 1:0.2, 1:0.5 and 1:0.7 mixing lowered $IC_{50}$ of CAELYX by 5, 15 and 16 times or more in colon cancer. For the doxorubicin solution, the omega liposome mixing did not affect cancer cell growth inhibition, therefore, the omega liposome mixing effects were specifically exhibited in case of the liposome type drug (FIG. 8, and Table 3).

TABLE 3

| Treatment | Mixing weight ratio (CAELYX PC:omega liposome PC) | Mixing method | Cancer cell line | $IC_{50}$ (nM) |
|---|---|---|---|---|
| Doxorubicin solution | | | HCT116 | 265 |
| Doxorubicin solution + omega liposome1 | | | HCT116 | 770 |
| CAELYX | | | HCT116 | >10,000 |
| CAELYX + omega liposome1 | 1:0.2 | Bath sonication | HCT116 | 2058 |
| CAELYX + omega liposome1 | 1:0.5 | Bath sonication | HCT116 | 670 |
| | 1:0.5 | Gentle mixing | | 650 |
| | 1:0.7 | Gentle mixing | HCT116 | 626 |
| Doxorubicin solution | | | B16F10 | 191 |
| CAELYX | | | B16F10 | 1945 |
| CAELYX + omega liposome2 | 1:0.5 | Gentle mixing | B16F10 | 269 |

Figure 9A:
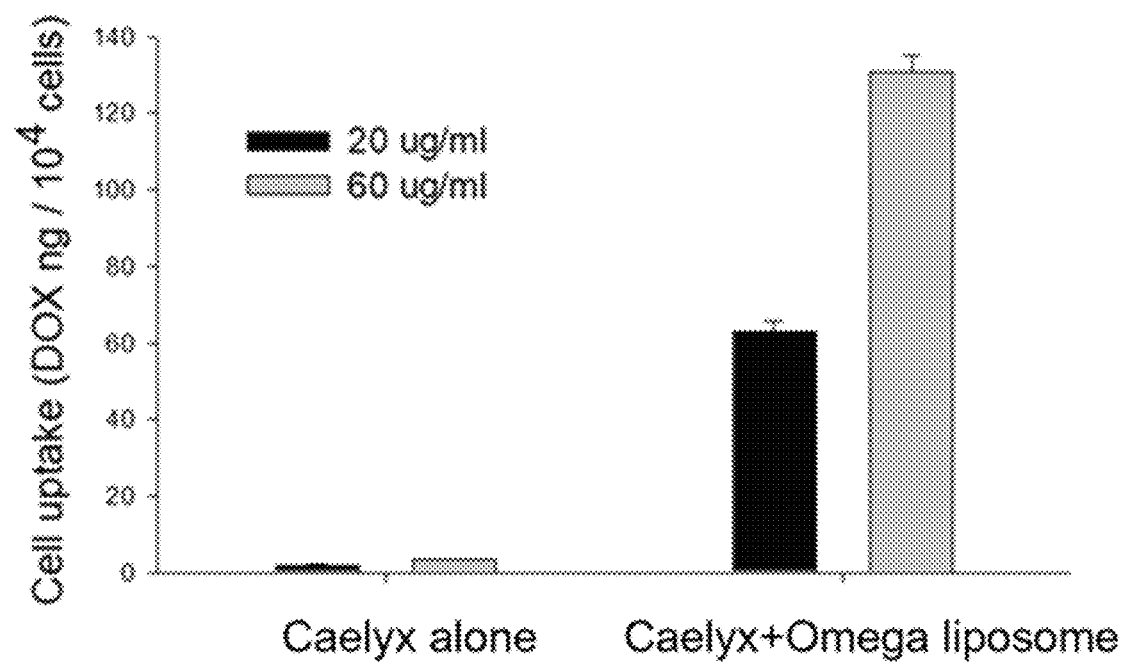
FIGS. 9A and 9B are graphs illustrating influx rates of the carried drug to cancer cells and cell nuclei, respectively, by the mixing of the drug carrying liposome with the empty liposome.

Experimental Example 4. Assessment of Extent of Intracellular and Intranuclear Uptake of Drug Carried in Liposome Due to Omega Liposome Mixing To investigate the effect of omega liposome mixing on the extent of cancer cell uptake of doxorubicin carried in the liposome, CAELYX mixed with omega liposome 1 indicated in Example 3 at a 1:0.5 weight ratio (PC in CAELYX: PC in omega liposome) was added to the cells, followed by quantification of doxorubicin concentration taken up by cells. As a result of the quantification, the extent of intracellular uptake of doxorubicin carried by CAELYX was remarkably increased by omega liposome mixing (FIG. 9A). That is, 2 hours after administration of CAELYX at 20 µg/ml or 60 µg/ml in terms of doxorubicin dose, intracellular amount of doxorubicin increased by about 30 times and 35 times due to the omega liposome mixing. When the liposome is given to cancer cells, drug uptake into the cells occurs mainly by membrane permeation of drug molecules after being released from the liposome. Accordingly, the increase in the extent of drug uptake into the cancer cells when omega liposome is mixed with CAELYX is because the release of doxorubicin is promoted before and after intracellular uptake.

Figure 9B:
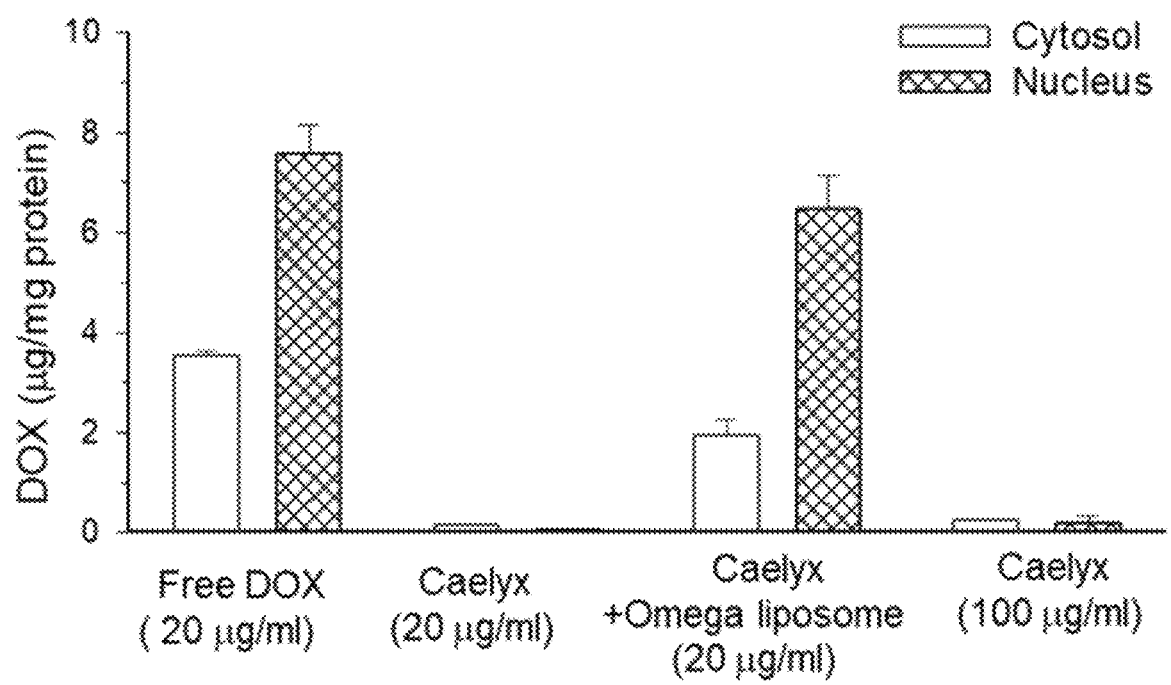

For doxorubicin to exhibit anticancer activity, intranuclear uptake thereof is required. In order to determine the extent of liposome-carried doxorubicin reaching cell nuclei due to the omega liposome mixing, the mixture was given to cells by the method of Example 5, followed by quantification of doxorubicin concentration introduced into cytoplasm fraction and nucleus fraction. As a result of the quantification, the extent of intranuclear uptake of doxorubicin carried in CAELYX was greatly increased by omega liposome mixing (FIG. 9B). That is, 3 hours after administration of CAELYX at 20 µg/ml in terms of a doxorubicin dose, the doxorubicin amount introduced into the cell nucleus increased by about 192 times due to the omega liposome mixing.

Experimental Example 5. Assessment of Changes in Pharmacokinetics of Liposome-Carried Drug Due to Omega Liposome Mixing According to the method of Example 1, omega liposome was prepared using 9.58 mg of di-DHA-PC, 0.8 mg of cholesterol and 0.3 mg of alpha-tocopherol, and then mixed with CAELYX (0.5:1 weight ratio in terms of PC in CAE-LYX:PC in omega liposome). Thereafter, pharmacokinetic assessment was performed by the method of Example 6.

Figure 10:
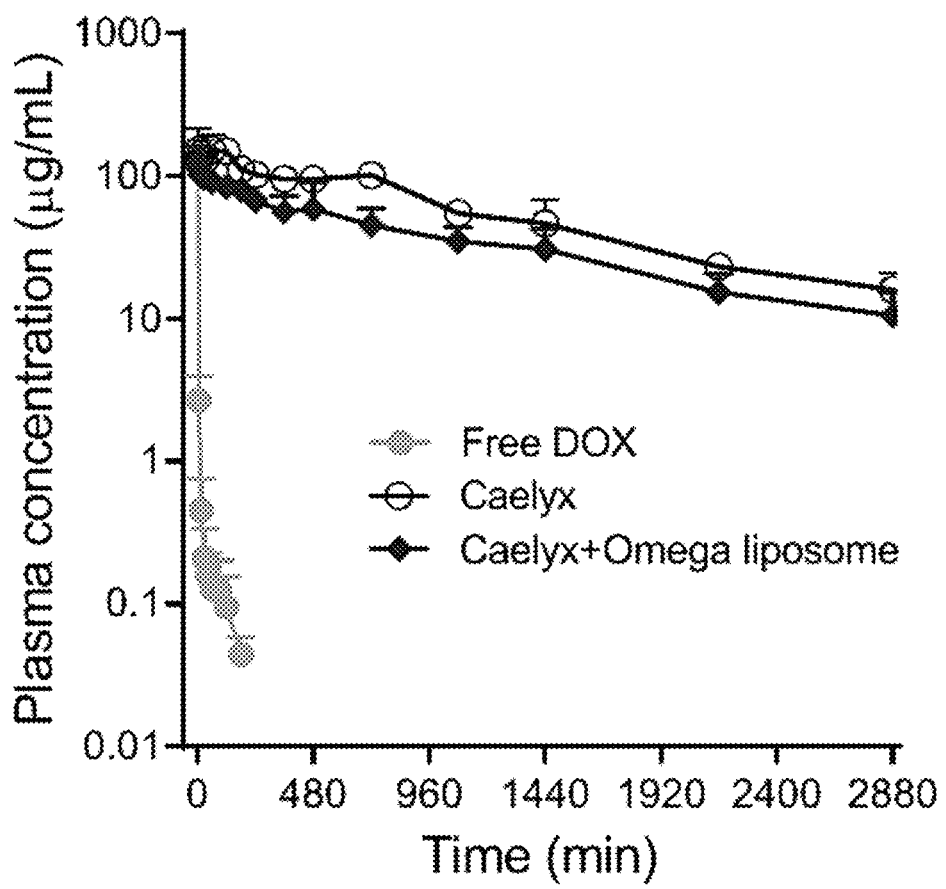
FIG. 10 is a graph illustrating average blood concentration-time curves with regard to doxorubicin over time after intravenous administration of doxorubicin, doxorubicin-carrying liposome (®CAELYX), and a mixed solution of CAELYX+empty liposome, respectively, to SD rats in a dose of 5 mg/kg in terms of doxorubicin.

To three groups of SD rats, doxorubicin solution, CAE-LYX and CAELYX+omega liposome were intravenously administered, respectively. Mean drug plasma concentration—time curves obtained after the above intravenous administration were shown in FIG. 10, and the pharmacokinetic parameters according to the above curves were listed in Table 4. Referring to FIG. 10, the doxorubicin solution group showed very fast decrease in the plasma concentration doxorubicin whereas the groups administered with CAE-LYX or CAELYX+omega liposome maintained a high plasma concentration for 48 hours or more. As a result, the blood half-life of doxorubicin was 118 minutes in the doxorubicin-treated group, while it significantly increased to 1038 minutes and 759 minutes in the CAELYX-treated- and CAELYX+omega liposome-treated group, respectively. Further, for AUC, the doxorubicin group exhibited relatively low value of 589 µg·min/mL, whereas the CAELYX group and the CAELYX+omega liposome group showed significantly increased AUC (by 333 times and 150 times, respectively, compared to doxorubicin group). When the CAE-LYX+omega liposome group was compared with CAELYX group, it showed decreased AUC, half-life and MRT compared to CAELYX group but a statistically significant difference was only obtained in regard to AUC. When the amount of doxorubicin in the urine up to 24 hours was compared, the doxorubicin excretion amount in the urine significantly increased due to an increase in doxorubicin released from CAELYX by omega liposome mixing (Table 4).

Taken together, when CAELYX is administered after mixing with omega liposome, AUC is reduced due to the omega liposome-induced release of doxorubicin from the CAELYX formulation, compared to administration of CAE-LYX alone. However, compared to the doxorubicin solution, AUC is still significantly high while showing long half-life so that pharmacokinetic characteristics of the liposome preparation are retained.

TABLE 4

| Parameters | Doxorubicin (n = 6) | CAELYX (n = 6) | CAELYX + omega liposome (n = 6) |
|---|---|---|---|
| Body weight (g)$^a$ | 271 ± 3.76 | 260 ± 9.02 | 262 ± 4.83$^b$ |
| Terminal half-life (min)$^b$ | 118 ± 41.4 | 1038 ± 454 | 759 ± 124 |
| AUC (µg · min/mL)$^c$ | 589 ± 143 | 196616 ± 36618$^a$ | 88302 ± 12540 |
| MRT (min)$^b$ | 71.0 ± 43.1 | 1453 ± 680 | 1093 ± 159 |
| CL (mL/min/kg)$^b$ | 8.91 ± 2.06 | 0.0261 ± 0.00451 | 0.0575 ± 0.0074 |
| Ae$_{0-24\ h}$ (% of dose)$^d$ | 4.53 ± 2.36 | 0.0488 ± 0.0159$^a$ | 2.95 ± 1.87 |

$^a$Doxorubicin group is significantly different from CAELYX group (P < 0.05).
$^b$Doxorubicin group is significantly different from CAELYX group and CAELYX + omega liposome group (P < 0.001).
$^c$Doxorubicin group is significantly different from CAELYX group and CAELYX + omega liposome group (P < 0.001), while CAELYX group is significantly different from CAELYX + omega liposome group (P < 0.01).
$^d$Doxorubicin group is significantly different from CAELYX group and CAELYX + omega liposome group (P < 0.01), while CAELYX group is significantly different from CAELYX + omega liposome group (P < 0.05).

Figure 11:
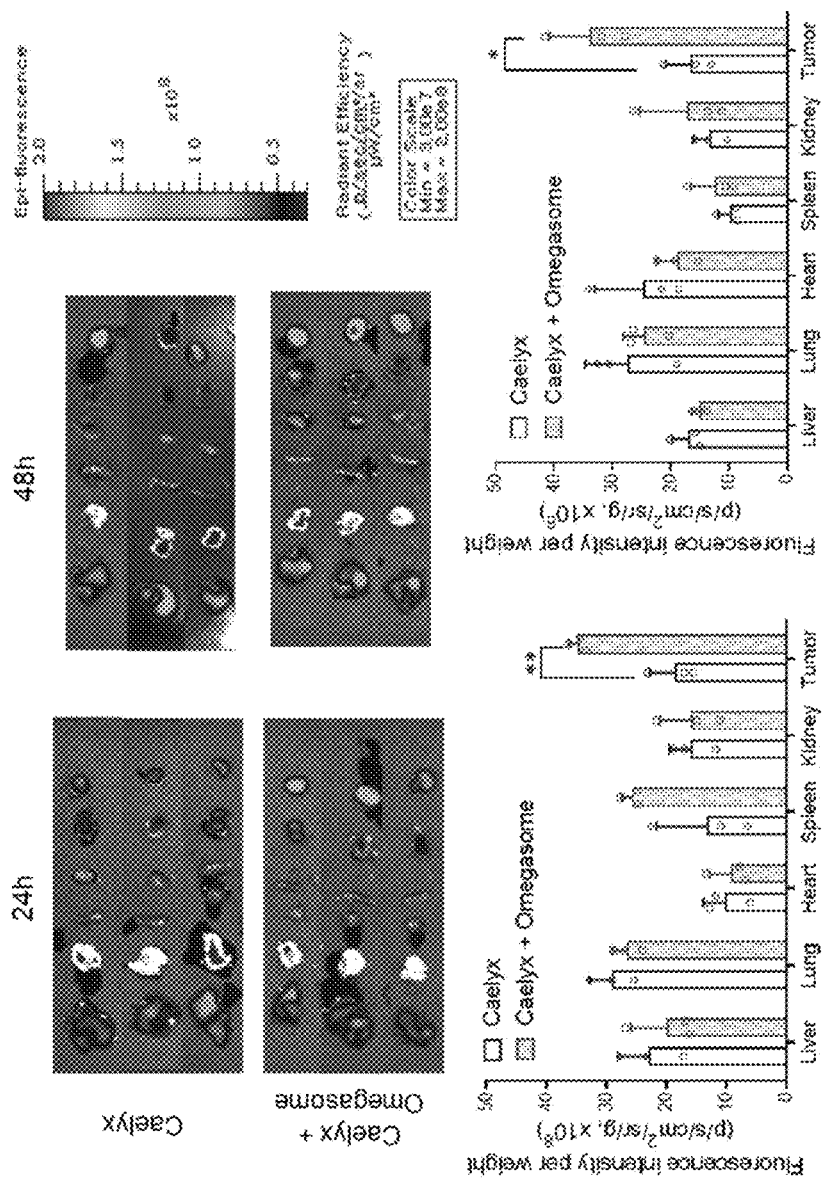
FIG. 11 is fluorescent images and graphs illustrating doxorubicin distribution levels in major organs and cancer tissues after 24 hours and 48 hours, respectively, when CAELYX and the CAELYX+empty liposome mixed solution are intravenously administered in an amount of 4 mg/kg in terms of doxorubicin dose to mice grafted with human colon cancer cells, respectively.

Experimental Example 6. Assessment of Changes in Tissue Distribution of Liposome-Carried Anticancer Drug Due to Omega Liposome Mixing in Tumor-Grafted Animal Model As indicated in experimental example 5, omega liposome was mixed with CAELYX. Thereafter, assessment of drug distribution in a tumor animal model was performed by the method of Example 7. Twenty four hours and 48 hours after intravenous administration, tumor tissues and liver, lung, heart, spleen and kidney were removed from each mouse. The doxorubicin distribution in the liver, lung, heart, spleen and kidney did not exhibit a significant change regardless of omega liposome mixing, while drug distribution in the tumor tissues was significantly increased by the omega liposome mixing (p<0.01 for 24 hours, and p<0.05 for 48 hours) (FIG. 11). That is, omega liposome mixing increased the drug accumulation in tumor tissue, a drug target site, while not affecting the drug distribution into the heart, a major tissue to which doxorubicin is toxic.

Figure 12A:
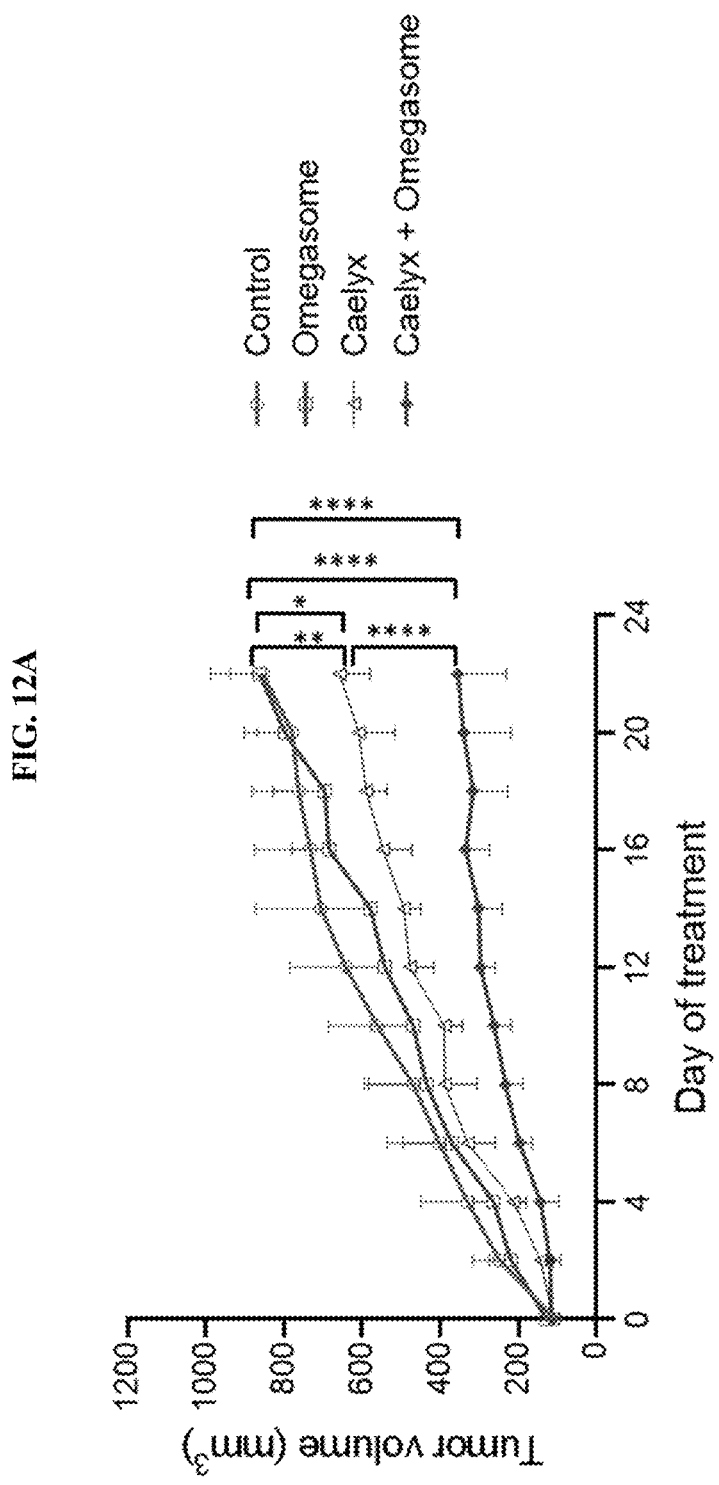
FIGS. 12A to 12C are graphs illustrating: variations in the tumor size over time (FIG. 12A) after intravenous administration twice of buffer (solvent for liposome preparation, Group 1), empty liposome (Group 2), CAELYX (Group 3) and CAELYX/empty liposome (Group 4) in an amount of 4 mg/kg corresponding to a doxorubicin dose, wherein colon cancer-grafted mice are divided into the above four groups; weights of cancer tissues removed from each mouse 22 days after administration (FIG. 12B); and changes in the body weight (FIG. 12C) of the mouse.
Figure 12C:
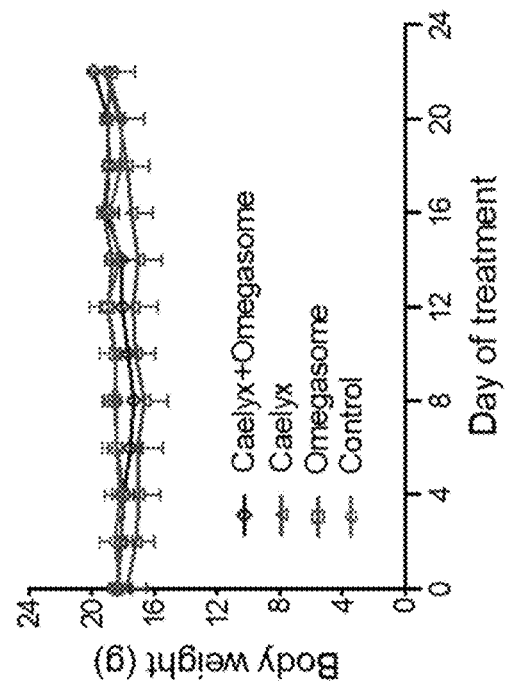
Figure 12B:
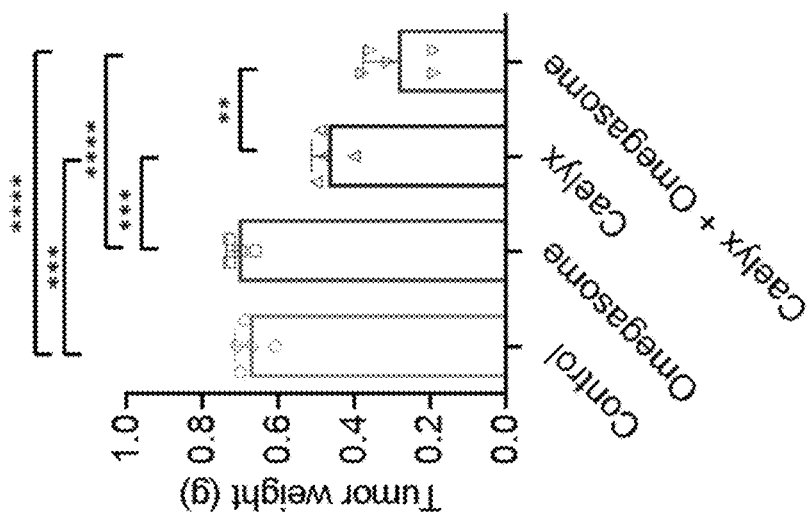

Experimental Example 7. Assessment of Changes in Pharmacological Activity of Liposome-Carried Anticancer Drug Due to Omega Liposome Mixing in Tumor-Grafted Animal Model As indicated in experimental example 5, omega liposome was mixed with CAELYX. Thereafter, assessment of pharmacological activity in a tumor animal model was performed by the method of Example 8. Measurement of changes in the tumor volume for 22 days after beginning the administration demonstrated that the tumor growth rates in CAELYX group and CAELYX+omega liposome group were considerably decreased (p<0.01 and p<0.0001 on day 22, respectively) compared to the control group. Further, the tumor growth rate was also significantly decreased when compared between CAELYX group and CAELYX+omega liposome group (p<0.0001 on day 22). There was no difference in the tumor growth rate between the omega liposome group and the control (p>0.05) (FIG. 12A). With regard to the body weight, a usually assessed toxicity indicator for anticancer treatment, any of the groups showed significant change in it (FIG. 12B). When the weight of the tumor removed on day 22 from each mouse was compared among groups, the tumor weight of CAELYX group and of the CAELYX+omega liposome group was considerably decreased compared to control group (p<0.001 and p<0.0001, respectively). Further, the tumor weight was also remarkably decreased in CAELYX+omega liposome group compared to the CAELYX group (p<0.01). There was no difference in the tumor weight between the omega liposome group and the control group (p>0.05) (FIG. 12C). These results mean that the omega liposome mixing before administration of CAELYX may noticeably improve its anticancer activity while not increasing its side effects.

What is claimed is:

1. A composition for delivering a drug, comprising a membrane-modified liposome formed by bringing a liposome carrying a drug into contact with an empty liposome not carrying the drug,
wherein empty liposome comprises a membrane comprised of phospholipid having a head and two fatty acid chains, wherein both of the two fatty acid chains comprises omega-3 fatty acids or their derivatives.

2. The composition of claim 1, wherein the omega-3 fatty acids are independently selected from the group consisting of docosahexaenoic acid (DHA) and eicosapentaenoic acid (EPA).

3. The composition of claim 1, wherein the membrane of the empty liposome further includes at least one of cholesterol, oleic acid, phospholipids combined with oleic acid, or α-tocopherol.

4. The composition of claim 1, wherein the phospholipid having the omega-3 fatty acids or their derivatives is included in an amount of 40% or more by weight based on a total lipid weight of the empty liposome.

5. The composition of claim 1, wherein the empty liposome has a diameter of 20 nm to 400 nm.

6. The composition of claim 1, wherein the empty liposome is dispersed in a solution containing at least one selected from the group consisting of histidine, sucrose, hydroxyethylpiperazine ethanesufonic acid, sodium chloride, phosphate and dextrose.

7. The composition according to claim 1, wherein the liposome carrying the drug includes phospholipid of which two fatty acid chains are saturated fatty acids.

8. The composition according to claim 7, wherein the phospholipid of which the two fatty acid chains are the saturated fatty acids is independently selected from the group consisting of: hydrogenated soy phosphatidylcholine (HSPC), 1,2-dimyristoyl-sn-glycero-3-phosphocholine (DMPC), hydrogenated egg phosphatidylcholine, 1,2-dipalmitoyl-sn-glycero-3-phosphocholine (DPPC) and 1,2-distearoyl-sn-glycero-3-phosphocholine (DSPC).

9. The composition according to claim 1, wherein a weight ratio of a phospholipid in the liposome carrying the drug and the phospholipid of the empty liposome is 1:0.1 to 1.

10. The composition according to claim 1, wherein the membrane-modified liposome has a diameter of 70 nm to 500 nm.

11. The composition according to claim 1, wherein the drug is an anticancer agent.

12. A method for delivering a drug in a subject, the method comprising:
administering the composition of claim 1 to the subject.

13. A kit for delivering a drug, the kit comprising:
a liposome carrying a drug; and
an empty liposome having a membrane comprising phospholipid having a head and two fatty acid chains, wherein both of the fatty acid chains comprise omega-3 fatty acids or their derivatives.

* * * * *